(12) United States Patent
Loehken (10) Patent No.: US 12,000,267 B2
(45) Date of Patent: Jun. 4, 2024

(54) COMMUNICATION AND LOCATION SYSTEM FOR AN AUTONOMOUS FRACK SYSTEM

(71) Applicant: DynaEnergetics Europe GmbH, Troisdorf (DE)

(72) Inventor: Joern Olaf Loehken, Troisdorf (DE)

(73) Assignee: DynaEnergetics Europe GmbH, Troisdorf (DE)

( * ) Notice: Subject to any disclaimer, the term of this patent is extended or adjusted under 35 U.S.C. 154(b) by 0 days.

(21) Appl. No.: 17/939,241

(22) Filed: Sep. 7, 2022

(65) Prior Publication Data

US 2023/0101018 A1 Mar. 30, 2023

Related U.S. Application Data

(60) Provisional application No. 63/247,898, filed on Sep. 24, 2021.

(51) Int. Cl.
| | | |
|---|---|---|
| *E21B 47/095* | (2012.01) | |
| *E21B 23/06* | (2006.01) | |
| *E21B 43/1185* | (2006.01) | |
| *E21B 43/119* | (2006.01) | |
| *G01V 1/52* | (2006.01) | |

(52) U.S. Cl.
CPC ............ *E21B 47/095* (2020.05); *E21B 23/06* (2013.01); *E21B 43/1185* (2013.01); *E21B 43/119* (2013.01); *G01V 1/52* (2013.01); *G01V 2001/526* (2013.01)

(58) Field of Classification Search
CPC ...... E21B 23/06; E21B 23/08; E21B 43/1185; E21B 43/119; E21B 47/092; E21B 47/095

See application file for complete search history.

(56) References Cited

U.S. PATENT DOCUMENTS

| | | |
|---|---|---|
| 1,757,288 A | 5/1930 | Bleecker |
| 2,062,974 A | 12/1936 | Lane |
| 2,142,572 A | 1/1939 | Metzner |
| 2,147,544 A | 2/1939 | Potts |
| 2,216,359 A | 10/1940 | Spencer |
| 2,228,873 A | 1/1941 | Hardt et al. |
| 2,252,270 A | 8/1941 | Miller |

(Continued)

FOREIGN PATENT DOCUMENTS

| | | |
|---|---|---|
| AR | 021476 A1 | 7/2002 |
| CA | 2021396 A1 | 1/1991 |

(Continued)

OTHER PUBLICATIONS

Giromax Directional, Gyroscopic and magnetic borehole surveying systems with outstanding quality andreliability, Feb. 14, 2016, 4 pgs., https://www.gyromax.com.au/inertial-sensing.html.

(Continued)

*Primary Examiner* — Daniel P Stephenson
(74) *Attorney, Agent, or Firm* — Womble Bond Dickinson (US) LLP (57) ABSTRACT

An autonomous wellbore tool may include a plug assembly and a positioning system. The positioning system may be provided on the plug assembly. According to an aspect, the positioning system includes a distance measurement system. The autonomous wellbore tool may include one of a perforating gun and a transmitter plug assembly.

13 Claims, 6 Drawing Sheets

(56) References Cited

U.S. PATENT DOCUMENTS

| | | |
|---|---|---|
| 2,296,346 A | 9/1942 | Hearn |
| 2,308,004 A | 1/1943 | Hart |
| 2,358,466 A | 9/1944 | Miller |
| 2,418,486 A | 4/1947 | Smylie |
| 2,439,394 A | 4/1948 | Lanzalotti et al. |
| 2,462,784 A | 2/1949 | Smith |
| 2,519,116 A | 8/1950 | Crake |
| 2,598,651 A | 5/1952 | Spencer |
| 2,618,343 A | 11/1952 | Conrad |
| 2,621,744 A | 12/1952 | Toelke |
| 2,681,114 A | 6/1954 | Conrad |
| 2,687,092 A | 8/1954 | Duesing |
| 2,696,258 A * | 12/1954 | Greene ............... E21B 33/134 166/187 |
| 2,696,259 A | 12/1954 | Greene |
| 2,713,909 A | 7/1955 | Baker |
| 2,713,910 A | 7/1955 | Baker et al. |
| 2,755,863 A | 7/1956 | Stansbury et al. |
| 2,756,958 A | 7/1956 | Binns et al. |
| 2,765,739 A | 10/1956 | Mohaupt et al. |
| 2,769,701 A | 11/1956 | Frederick |
| 2,807,325 A | 9/1957 | Webb |
| 2,815,816 A | 12/1957 | Baker |
| 2,889,775 A | 6/1959 | Owen |
| 2,979,904 A | 4/1961 | Royer |
| 3,013,491 A | 12/1961 | Poulter |
| 3,024,843 A | 3/1962 | Dean |
| 3,026,939 A | 3/1962 | Sweetman |
| 3,031,964 A | 5/1962 | Chesnut |
| 3,036,636 A | 5/1962 | Clark |
| 3,055,430 A | 9/1962 | Campbell |
| 3,076,507 A | 2/1963 | Sweetman |
| 3,116,690 A | 1/1964 | Gillingham et al. |
| 3,140,537 A | 7/1964 | Popoff |
| 3,155,164 A | 11/1964 | Keener |
| 3,158,680 A | 11/1964 | Lovitt et al. |
| 3,160,209 A | 12/1964 | Bonner |
| 3,170,400 A | 2/1965 | Nelson |
| 3,186,485 A | 6/1965 | Owen |
| 3,233,674 A | 2/1966 | Kurt |
| 3,246,707 A | 4/1966 | Bell |
| 3,264,994 A | 8/1966 | Kurt |
| 3,266,575 A | 8/1966 | Owen |
| 3,357,355 A | 12/1967 | Roush |
| 3,361,204 A | 1/1968 | Howard et al. |
| 3,366,179 A | 1/1968 | Kinley et al. |
| 3,374,735 A | 3/1968 | Moore |
| 3,398,803 A | 8/1968 | Kurt et al. |
| 3,498,376 A | 3/1970 | Sizer et al. |
| 3,504,723 A | 4/1970 | Cushman et al. |
| 3,630,284 A | 12/1971 | Fast et al. |
| 3,669,190 A | 6/1972 | Sizer et al. |
| 3,691,954 A | 9/1972 | Kern |
| 3,712,376 A | 1/1973 | Young et al. |
| 3,762,470 A | 10/1973 | Eggleston |
| 3,859,921 A | 1/1975 | Stephenson |
| 3,892,455 A | 7/1975 | Sotolongo |
| 4,007,790 A | 2/1977 | Henning |
| 4,039,239 A | 8/1977 | Cobaugh et al. |
| 4,058,061 A | 11/1977 | Mansur, Jr. et al. |
| 4,107,453 A | 8/1978 | Erixon |
| 4,172,421 A | 10/1979 | Regalbuto |
| 4,182,216 A | 1/1980 | DeCaro |
| 4,191,265 A | 3/1980 | Bosse-Platiere |
| 4,250,960 A | 2/1981 | Chammas |
| 4,266,613 A | 5/1981 | Boop |
| 4,269,120 A | 5/1981 | Brede et al. |
| 4,290,486 A | 9/1981 | Regalbuto |
| 4,312,273 A | 1/1982 | Camp |
| 4,317,413 A | 3/1982 | Strandli et al. |
| 4,319,526 A | 3/1982 | DerMott |
| 4,346,954 A | 8/1982 | Appling |
| 4,363,529 A | 12/1982 | Loose |
| 4,411,491 A | 10/1983 | Larkin et al. |
| 4,479,584 A | 10/1984 | Raz |
| 4,485,741 A | 12/1984 | Moore et al. |
| 4,491,185 A | 1/1985 | McClure |
| 4,496,008 A | 1/1985 | Pottier et al. |
| 4,512,418 A | 4/1985 | Regalbuto et al. |
| 4,523,650 A | 6/1985 | Sehnert et al. |
| 4,530,396 A | 7/1985 | Mohaupt |
| 4,534,423 A | 8/1985 | Regalbuto |
| 4,535,842 A | 8/1985 | Ross |
| 4,566,544 A | 1/1986 | Bagley et al. |
| 4,574,892 A | 3/1986 | Grigar et al. |
| 4,583,602 A | 4/1986 | Ayers |
| 4,609,056 A | 9/1986 | Colle, Jr. et al. |
| 4,609,057 A | 9/1986 | Walker et al. |
| 4,617,997 A | 10/1986 | Jennings, Jr. |
| 4,619,318 A | 10/1986 | Terrell et al. |
| 4,620,591 A | 11/1986 | Terrell et al. |
| 4,637,478 A | 1/1987 | George |
| 4,640,370 A | 2/1987 | Wetzel |
| 4,650,009 A | 3/1987 | McClure et al. |
| 4,660,910 A | 4/1987 | Sharp et al. |
| 4,662,450 A | 5/1987 | Haugen |
| 4,730,793 A | 3/1988 | Thurber, Jr. et al. |
| 4,739,839 A | 4/1988 | Regalbuto et al. |
| 4,754,812 A | 7/1988 | Gentry |
| 4,776,393 A | 10/1988 | Forehand et al. |
| 4,790,383 A | 12/1988 | Savage et al. |
| 4,798,244 A | 1/1989 | Trost |
| 4,800,815 A | 1/1989 | Appledorn et al. |
| 4,840,231 A | 6/1989 | Berzin et al. |
| 4,852,647 A | 8/1989 | Mohaupt |
| 4,859,196 A | 8/1989 | Durando et al. |
| 4,869,325 A | 9/1989 | Halbardier |
| 4,889,183 A | 12/1989 | Sommers et al. |
| 4,898,245 A | 2/1990 | Braddick |
| 5,006,833 A | 4/1991 | Marlowe et al. |
| 5,024,270 A | 6/1991 | Bostick |
| 5,027,708 A | 7/1991 | Gonzalez et al. |
| 5,046,567 A | 9/1991 | Aitken et al. |
| 5,050,691 A | 9/1991 | Moses |
| 5,052,489 A | 10/1991 | Carisella et al. |
| 5,060,573 A | 10/1991 | Montgomery et al. |
| 5,070,788 A | 12/1991 | Carisella et al. |
| 5,083,929 A | 1/1992 | Dalton |
| 5,088,413 A | 2/1992 | Huber |
| 5,105,742 A | 4/1992 | Sumner |
| 5,159,145 A | 10/1992 | Carisella et al. |
| 5,211,224 A | 5/1993 | Bouldin |
| 5,223,665 A | 6/1993 | Burleson et al. |
| 5,237,136 A | 8/1993 | Langston |
| 5,241,891 A | 9/1993 | Hayes et al. |
| 5,303,772 A | 4/1994 | George et al. |
| 5,316,087 A | 5/1994 | Manke et al. |
| 5,322,019 A | 6/1994 | Hyland |
| 5,346,014 A | 9/1994 | Ross |
| 5,358,418 A | 10/1994 | Carmichael |
| 5,392,851 A | 2/1995 | Arend |
| 5,392,860 A | 2/1995 | Ross |
| 5,396,951 A | 3/1995 | Ross |
| 5,398,760 A | 3/1995 | George et al. |
| 5,436,791 A | 7/1995 | Turano et al. |
| 5,447,202 A | 9/1995 | Littleford |
| 5,456,319 A | 10/1995 | Schmidt et al. |
| 5,493,068 A | 2/1996 | Klein et al. |
| 5,501,606 A | 3/1996 | Oda et al. |
| 5,509,480 A | 4/1996 | Terrell et al. |
| 5,529,509 A | 6/1996 | Hayes et al. |
| 5,558,531 A | 9/1996 | Ikeda et al. |
| 5,575,331 A | 11/1996 | Terrell |
| 5,603,384 A | 2/1997 | Bethel et al. |
| 5,648,635 A | 7/1997 | Lussier et al. |
| 5,671,899 A | 9/1997 | Nicholas et al. |
| 5,673,760 A | 10/1997 | Brooks et al. |
| 5,679,032 A | 10/1997 | Auclair |
| 5,703,319 A | 12/1997 | Fritz et al. |
| 5,732,869 A | 3/1998 | Hirtl |
| 5,759,056 A | 6/1998 | Costello et al. |
| 5,765,962 A | 6/1998 | Cornell et al. |
| 5,769,661 A | 6/1998 | Nealis |
| 5,785,130 A | 7/1998 | Wesson et al. |

(56) References Cited

U.S. PATENT DOCUMENTS

| | | |
|---|---|---|
| 5,797,761 A | 8/1998 | Ring |
| 5,816,343 A | 10/1998 | Markel et al. |
| 5,820,402 A | 10/1998 | Chiacchio et al. |
| 5,831,204 A | 11/1998 | Lubben et al. |
| 5,837,924 A | 11/1998 | Austin |
| 5,837,925 A | 11/1998 | Nice |
| 5,871,052 A | 2/1999 | Benson et al. |
| 5,927,402 A | 7/1999 | Benson et al. |
| 5,992,289 A | 11/1999 | George et al. |
| 5,992,523 A | 11/1999 | Burleson et al. |
| 6,006,833 A | 12/1999 | Burleson et al. |
| 6,012,525 A | 1/2000 | Burleson et al. |
| 6,056,058 A | 5/2000 | Gonzalez |
| 6,082,450 A | 7/2000 | Snider et al. |
| 6,102,120 A | 8/2000 | Chen et al. |
| 6,102,724 A | 8/2000 | Ring |
| 6,112,666 A | 9/2000 | Murray et al. |
| 6,164,375 A | 12/2000 | Carisella |
| 6,182,765 B1 | 2/2001 | Kilgore |
| 6,216,596 B1 | 4/2001 | Wesson |
| 6,227,116 B1 | 5/2001 | Dumenko |
| 6,263,283 B1 | 7/2001 | Snider et al. |
| 6,269,875 B1 | 8/2001 | Harrison, III et al. |
| 6,272,782 B1 | 8/2001 | Dittrich et al. |
| 6,297,447 B1 | 10/2001 | Burnett et al. |
| 6,298,915 B1 | 10/2001 | George |
| 6,305,287 B1 | 10/2001 | Capers et al. |
| 6,315,461 B1 | 11/2001 | Cairns |
| 6,333,699 B1 | 12/2001 | Zierolf |
| 6,349,767 B2 | 2/2002 | Gissler |
| 6,354,374 B1 | 3/2002 | Edwards et al. |
| 6,385,031 B1 | 5/2002 | Lerche et al. |
| 6,408,758 B1 | 6/2002 | Duguet |
| 6,412,388 B1 | 7/2002 | Frazier |
| 6,412,415 B1 | 7/2002 | Kothari et al. |
| 6,413,117 B1 | 7/2002 | Annerino et al. |
| 6,414,905 B1 | 7/2002 | Owens et al. |
| 6,418,853 B1 | 7/2002 | Duguet et al. |
| 6,419,044 B1 | 7/2002 | Tite et al. |
| 6,435,096 B1 | 8/2002 | Watson |
| 6,439,121 B1 | 8/2002 | Gillingham |
| 6,454,011 B1 | 9/2002 | Schempf et al. |
| 6,457,526 B1 | 10/2002 | Dailey |
| 6,467,387 B1 | 10/2002 | Espinosa et al. |
| 6,474,931 B1 | 11/2002 | Austin et al. |
| 6,487,973 B1 | 12/2002 | Gilbert, Jr. et al. |
| 6,488,093 B2 | 12/2002 | Moss |
| 6,497,285 B2 | 12/2002 | Walker |
| 6,502,736 B2 | 1/2003 | Dittrich et al. |
| 6,516,901 B1 | 2/2003 | Falgout |
| 6,571,906 B2 | 6/2003 | Jones et al. |
| 6,591,753 B1 | 7/2003 | Schmid et al. |
| 6,618,237 B2 | 9/2003 | Eddy et al. |
| 6,651,747 B2 | 11/2003 | Chen et al. |
| 6,659,180 B2 | 12/2003 | Moss |
| 6,679,327 B2 | 1/2004 | Sloan et al. |
| 6,702,009 B1 | 3/2004 | Drury et al. |
| 6,719,061 B2 | 4/2004 | Muller et al. |
| 6,739,265 B1 | 5/2004 | Badger et al. |
| 6,742,602 B2 | 6/2004 | Trotechaud |
| 6,752,083 B1 | 6/2004 | Erche et al. |
| 6,772,868 B2 | 8/2004 | Warner |
| 6,779,605 B2 | 8/2004 | Jackson |
| 6,808,021 B2 | 10/2004 | Zimmerman et al. |
| 6,817,298 B1 | 11/2004 | Zharkov et al. |
| 6,820,693 B2 | 11/2004 | Hales et al. |
| 6,843,317 B2 | 1/2005 | Mackenzie |
| 6,851,471 B2 | 2/2005 | Barlow et al. |
| 6,880,637 B2 | 4/2005 | Myers, Jr. et al. |
| 6,890,191 B1 | 5/2005 | Thorburn |
| 6,902,414 B2 | 6/2005 | Dopf et al. |
| 6,938,689 B2 | 9/2005 | Farrant et al. |
| 6,942,033 B2 | 9/2005 | Brooks et al. |
| 6,976,857 B1 | 12/2005 | Shukla et al. |
| 7,013,977 B2 | 3/2006 | Nordaas |
| 7,018,164 B2 | 3/2006 | Anthis et al. |
| 7,036,598 B2 | 5/2006 | Skjærseth et al. |
| 7,044,219 B2 | 5/2006 | Mason et al. |
| 7,044,230 B2 | 5/2006 | Starr et al. |
| 7,066,261 B2 | 6/2006 | Vicente et al. |
| 7,073,589 B2 | 7/2006 | Tiernan et al. |
| 7,074,064 B2 | 7/2006 | Wallace |
| 7,093,664 B2 | 8/2006 | Todd et al. |
| 7,114,564 B2 | 10/2006 | Parrott et al. |
| 7,128,162 B2 | 10/2006 | Quinn |
| 7,140,453 B2 | 11/2006 | Ayling |
| 7,168,494 B2 | 1/2007 | Starr et al. |
| 7,182,611 B2 | 2/2007 | Borden et al. |
| 7,182,625 B2 | 2/2007 | Machado et al. |
| 7,193,156 B2 | 3/2007 | Alznauer et al. |
| 7,193,527 B2 | 3/2007 | Hall |
| 7,217,917 B1 | 5/2007 | Tumlin et al. |
| 7,234,525 B2 | 6/2007 | Alves et al. |
| 7,237,626 B2 | 7/2007 | Gurjar et al. |
| 7,240,742 B2 | 7/2007 | Sewell et al. |
| 7,243,722 B2 | 7/2007 | Oosterling et al. |
| 7,246,548 B2 | 7/2007 | Kash |
| 7,270,188 B2 | 9/2007 | Cook et al. |
| 7,278,482 B2 | 10/2007 | Azar |
| 7,278,491 B2 | 10/2007 | Scott |
| 7,299,903 B2 | 11/2007 | Rockwell et al. |
| 7,303,017 B2 | 12/2007 | Barker et al. |
| 7,322,416 B2 | 1/2008 | Burris, II et al. |
| 7,331,394 B2 | 2/2008 | Edwards et al. |
| 7,347,279 B2 | 3/2008 | Li et al. |
| 7,353,879 B2 | 4/2008 | Todd et al. |
| 7,357,083 B2 | 4/2008 | Takahara et al. |
| 7,360,487 B2 | 4/2008 | Myers, Jr. et al. |
| 7,364,451 B2 | 4/2008 | Ring et al. |
| 7,404,725 B2 | 7/2008 | Hall et al. |
| 7,405,358 B2 | 7/2008 | Emerson |
| 7,428,932 B1 | 9/2008 | Wintill et al. |
| 7,431,075 B2 | 10/2008 | Brooks et al. |
| 7,441,601 B2 | 10/2008 | George et al. |
| 7,455,104 B2 | 11/2008 | Duhon et al. |
| 7,461,580 B2 | 12/2008 | Bell et al. |
| 7,481,662 B1 | 1/2009 | Rehrig |
| 7,533,722 B2 | 5/2009 | George et al. |
| 7,540,758 B2 | 6/2009 | Ho |
| 7,553,078 B2 | 6/2009 | Hanzawa et al. |
| 7,565,927 B2 | 7/2009 | Gerez et al. |
| 7,568,429 B2 | 8/2009 | Hummel et al. |
| 7,574,960 B1 | 8/2009 | Dockery et al. |
| 7,591,212 B2 | 9/2009 | Myers, Jr. et al. |
| 7,604,062 B2 | 10/2009 | Murray |
| 7,607,379 B2 | 10/2009 | Rospek et al. |
| 7,631,704 B2 | 12/2009 | Hagemeyer et al. |
| 7,650,947 B2 | 1/2010 | Henke et al. |
| 7,661,474 B2 | 2/2010 | Campbell et al. |
| 7,721,650 B2 | 5/2010 | Barton et al. |
| 7,726,396 B2 | 6/2010 | Briquet et al. |
| 7,735,578 B2 | 6/2010 | Loehr et al. |
| 7,748,447 B2 | 7/2010 | Moore |
| 7,748,457 B2 | 7/2010 | Walton et al. |
| 7,752,971 B2 | 7/2010 | Loehr |
| 7,762,172 B2 | 7/2010 | Li et al. |
| 7,762,351 B2 | 7/2010 | Vidal |
| 7,778,006 B2 | 8/2010 | Stewart et al. |
| 7,779,926 B2 | 8/2010 | Turley et al. |
| 7,794,243 B1 | 9/2010 | Rzasa et al. |
| 7,810,430 B2 | 10/2010 | Chan et al. |
| 7,823,508 B2 | 11/2010 | Anderson et al. |
| 7,896,077 B2 | 3/2011 | Behrmann et al. |
| 7,905,290 B2 | 3/2011 | Schicks |
| 7,908,970 B1 | 3/2011 | Jakaboski et al. |
| 7,913,603 B2 | 3/2011 | LaGrange et al. |
| 7,929,270 B2 | 4/2011 | Hummel et al. |
| 7,952,035 B2 | 5/2011 | Falk et al. |
| 7,980,309 B2 | 7/2011 | Crawford |
| 7,980,874 B2 | 7/2011 | Finke et al. |
| 8,006,765 B2 | 8/2011 | Richards et al. |
| 8,028,624 B2 | 10/2011 | Mattson |
| 8,038,453 B2 | 10/2011 | Robicheau et al. |
| 8,052,490 B2 | 11/2011 | Bernasch et al. |

(56) References Cited

U.S. PATENT DOCUMENTS

| | | |
|---|---|---|
| 8,066,083 B2 | 11/2011 | Hales et al. |
| 8,069,789 B2 | 12/2011 | Hummel et al. |
| 8,079,296 B2 | 12/2011 | Barton et al. |
| 8,127,846 B2 | 3/2012 | Hill et al. |
| 8,136,585 B2 | 3/2012 | Cherewyk |
| 8,141,434 B2 | 3/2012 | Kippersund et al. |
| 8,141,639 B2 | 3/2012 | Gartz et al. |
| 8,151,882 B2 | 4/2012 | Grigar et al. |
| 8,157,022 B2 | 4/2012 | Bertoja et al. |
| 8,181,718 B2 | 5/2012 | Burleson et al. |
| 8,182,212 B2 | 5/2012 | Parcell |
| 8,186,259 B2 | 5/2012 | Burleson et al. |
| 8,186,425 B2 | 5/2012 | Smart et al. |
| 8,230,946 B2 | 7/2012 | Crawford et al. |
| 8,256,337 B2 | 9/2012 | Hill et al. |
| 8,297,345 B2 | 10/2012 | Emerson |
| 8,317,448 B2 | 11/2012 | Hankins et al. |
| 8,322,426 B2 | 12/2012 | Wright et al. |
| 8,327,746 B2 | 12/2012 | Behrmann et al. |
| 8,336,437 B2 | 12/2012 | Barlow et al. |
| 8,388,374 B2 | 3/2013 | Grek et al. |
| 8,395,878 B2 | 3/2013 | Stewart et al. |
| 8,397,741 B2 | 3/2013 | Bisset |
| 8,413,727 B2 | 4/2013 | Holmes |
| 8,439,114 B2 | 5/2013 | Parrott et al. |
| 8,449,308 B2 | 5/2013 | Smith |
| 8,464,624 B2 | 6/2013 | Asahina et al. |
| 8,469,087 B2 | 6/2013 | Gray |
| 8,505,632 B2 | 8/2013 | Guerrero et al. |
| 8,522,863 B2 | 9/2013 | Tiernan et al. |
| 8,561,683 B2 | 10/2013 | Wood et al. |
| 8,578,090 B1 | 11/2013 | Jernigan, IV |
| 8,661,978 B2 | 3/2014 | Backhus et al. |
| 8,678,666 B2 | 3/2014 | Scadden et al. |
| 8,695,506 B2 | 4/2014 | Lanclos |
| 8,695,716 B2 | 4/2014 | Ravensbergen |
| 8,752,486 B2 | 6/2014 | Robertson et al. |
| 8,770,301 B2 | 7/2014 | Bell |
| 8,807,003 B2 | 8/2014 | Le et al. |
| 8,810,247 B2 | 8/2014 | Kuckes |
| 8,826,821 B2 | 9/2014 | Martin |
| 8,863,665 B2 | 10/2014 | DeVries et al. |
| 8,875,787 B2 | 11/2014 | Tassaroli |
| 8,881,816 B2 | 11/2014 | Glenn et al. |
| 8,881,836 B2 | 11/2014 | Ingram |
| 8,899,322 B2 | 12/2014 | Cresswell et al. |
| 8,904,935 B1 | 12/2014 | Brown et al. |
| 8,950,480 B1 | 2/2015 | Strickland |
| 9,617,814 B2 | 4/2017 | Seals et al. |
| 9,617,829 B2 | 4/2017 | Dale et al. |
| 9,797,238 B2 | 10/2017 | Frosell et al. |
| 9,903,192 B2 | 2/2018 | Entchev et al. |
| 10,000,994 B1 | 6/2018 | Sites |
| 10,001,007 B2 | 6/2018 | Pelletier et al. |
| 10,018,018 B2 | 7/2018 | Cannon et al. |
| 10,036,236 B1 | 7/2018 | Sullivan et al. |
| 10,041,321 B2 | 8/2018 | Oag et al. |
| 10,053,968 B2 | 8/2018 | Tolman et al. |
| 10,054,414 B2 | 8/2018 | Scheid et al. |
| 10,066,921 B2 | 9/2018 | Eitschberger |
| 10,077,641 B2 | 9/2018 | Rogman et al. |
| 10,087,708 B2 | 10/2018 | Al-Gouhi et al. |
| 10,107,054 B2 | 10/2018 | Drury et al. |
| 10,107,064 B2 | 10/2018 | Richards et al. |
| 10,138,713 B2 | 11/2018 | Tolman et al. |
| 10,151,152 B2 | 12/2018 | Wight et al. |
| 10,151,180 B2 | 12/2018 | Robey et al. |
| 10,151,181 B2 | 12/2018 | Lopez et al. |
| 10,167,691 B2 | 1/2019 | Zhang et al. |
| 10,174,595 B2 | 1/2019 | Knight et al. |
| 10,246,952 B2 | 4/2019 | Trydal et al. |
| 10,246,961 B2 | 4/2019 | Robertson et al. |
| 10,267,603 B2 | 4/2019 | Marshall et al. |
| 10,273,788 B2 | 4/2019 | Bradley et al. |
| 10,301,910 B2 | 5/2019 | Whitsitt et al. |
| 10,309,199 B2 | 6/2019 | Eitschberger |
| 10,321,594 B2 | 6/2019 | Zhu et al. |
| 10,323,484 B2 | 6/2019 | Liess |
| 10,337,301 B2 | 7/2019 | Harive |
| 10,352,144 B2 | 7/2019 | Entchev et al. |
| 10,358,880 B2 | 7/2019 | Metcalf et al. |
| 10,365,079 B2 | 7/2019 | Harrington et al. |
| 10,422,195 B2 | 9/2019 | LaGrange et al. |
| 10,428,595 B2 | 10/2019 | Bradley et al. |
| 10,429,161 B2 | 10/2019 | Parks et al. |
| 10,458,213 B1 | 10/2019 | Eitschberger et al. |
| 10,472,901 B2 | 11/2019 | Engel et al. |
| 10,472,938 B2 | 11/2019 | Parks et al. |
| 10,488,163 B2 | 11/2019 | Collins et al. |
| 10,538,981 B2 | 1/2020 | Covalt et al. |
| 10,598,002 B2 | 3/2020 | Sites |
| 10,605,018 B2 | 3/2020 | Schmidt et al. |
| 10,605,037 B2 | 3/2020 | Eitschberger et al. |
| 10,605,040 B2 | 3/2020 | Hardesty et al. |
| 10,612,340 B2 | 4/2020 | Snider et al. |
| 10,669,822 B2 | 6/2020 | Eitschberger |
| 10,677,026 B2 | 6/2020 | Sokolove et al. |
| 10,689,931 B2 | 6/2020 | Mickey et al. |
| 10,794,159 B2 | 10/2020 | Eitschberger et al. |
| 10,844,678 B2 | 11/2020 | Mickey et al. |
| 10,844,684 B2 | 11/2020 | Fitschberger |
| 10,927,650 B2 | 2/2021 | Schultz et al. |
| 11,053,759 B2 | 7/2021 | Covalt et al. |
| 11,053,760 B2 | 7/2021 | Baker et al. |
| 11,149,515 B1 | 10/2021 | Bull et al. |
| 2002/0020320 A1 | 2/2002 | Lebaudy et al. |
| 2002/0036101 A1 | 3/2002 | Huhdanmaki et al. |
| 2002/0040783 A1 | 4/2002 | Zimmerman et al. |
| 2002/0062991 A1 | 5/2002 | Farrant et al. |
| 2002/0129940 A1 | 9/2002 | Yang et al. |
| 2002/0129941 A1 | 9/2002 | Alves et al. |
| 2002/0134552 A1 | 9/2002 | Moss |
| 2002/0145423 A1 | 10/2002 | Yoo |
| 2003/0000411 A1 | 1/2003 | Cernocky et al. |
| 2003/0001753 A1 | 1/2003 | Cernocky et al. |
| 2003/0155112 A1 | 8/2003 | Tiernan et al. |
| 2003/0234110 A1* | 12/2003 | McGregor ............ E21B 34/14 166/381 |
| 2004/0094305 A1 | 5/2004 | Skjærseth et al. |
| 2004/0141279 A1 | 7/2004 | Amano et al. |
| 2004/0211862 A1 | 10/2004 | Elam |
| 2004/0216632 A1 | 11/2004 | Finsterwald |
| 2004/0216868 A1 | 11/2004 | Owen |
| 2004/0239521 A1 | 12/2004 | Zierolf |
| 2005/0011645 A1 | 1/2005 | Aronstam et al. |
| 2005/0103526 A1 | 5/2005 | Ayling |
| 2005/0178282 A1 | 8/2005 | Brooks et al. |
| 2005/0183610 A1 | 8/2005 | Barton et al. |
| 2005/0186823 A1 | 8/2005 | Ring et al. |
| 2005/0194146 A1 | 9/2005 | Barker et al. |
| 2005/0217844 A1 | 10/2005 | Edwards et al. |
| 2005/0218260 A1 | 10/2005 | Corder et al. |
| 2005/0229805 A1 | 10/2005 | Myers et al. |
| 2005/0241824 A1 | 11/2005 | Burris et al. |
| 2005/0241825 A1 | 11/2005 | Burris et al. |
| 2005/0241835 A1 | 11/2005 | Burris et al. |
| 2005/0269083 A1 | 12/2005 | Burris, II et al. |
| 2006/0013282 A1 | 1/2006 | Hanzawa et al. |
| 2006/0054326 A1 | 3/2006 | Alves et al. |
| 2006/0075890 A1 | 4/2006 | Tiernan |
| 2006/0081374 A1 | 4/2006 | Bland et al. |
| 2007/0079966 A1 | 4/2007 | George et al. |
| 2007/0084336 A1 | 4/2007 | Neves |
| 2007/0125540 A1 | 6/2007 | Gerez et al. |
| 2007/0158071 A1 | 7/2007 | Mooney et al. |
| 2007/0267195 A1 | 11/2007 | Grigar et al. |
| 2008/0029302 A1 | 2/2008 | Scott |
| 2008/0047456 A1 | 2/2008 | Li et al. |
| 2008/0047716 A1 | 2/2008 | McKee et al. |
| 2008/0110612 A1 | 5/2008 | Prinz et al. |
| 2008/0110632 A1 | 5/2008 | Beall |
| 2008/0121095 A1 | 5/2008 | Han et al. |
| 2008/0134922 A1 | 6/2008 | Grattan et al. |
| 2008/0173204 A1 | 7/2008 | Anderson et al. |

(56) References Cited

U.S. PATENT DOCUMENTS

| | | |
|---|---|---|
| 2008/0223587 A1 | 9/2008 | Cherewyk |
| 2008/0264639 A1 | 10/2008 | Parrott et al. |
| 2009/0050322 A1 | 2/2009 | Hill et al. |
| 2009/0159283 A1 | 6/2009 | Fuller et al. |
| 2009/0159285 A1 | 6/2009 | Goodman |
| 2009/0211760 A1 | 8/2009 | Richards et al. |
| 2009/0255728 A1 | 10/2009 | Spencer et al. |
| 2009/0272519 A1 | 11/2009 | Green et al. |
| 2009/0301723 A1 | 12/2009 | Gray |
| 2009/0308589 A1 | 12/2009 | Bruins et al. |
| 2010/0000789 A1 | 1/2010 | Barton et al. |
| 2010/0012774 A1 | 1/2010 | Fanucci et al. |
| 2010/0022125 A1 | 1/2010 | Burris et al. |
| 2010/0089643 A1 | 4/2010 | Vidal |
| 2010/0096131 A1 | 4/2010 | Hill et al. |
| 2010/0107917 A1 | 5/2010 | Moser |
| 2010/0163224 A1 | 7/2010 | Strickland |
| 2010/0206064 A1 | 8/2010 | Estes |
| 2010/0230104 A1 | 9/2010 | Nölke et al. |
| 2010/0288496 A1 | 11/2010 | Cherewyk |
| 2011/0005777 A1 | 1/2011 | Meff |
| 2011/0024116 A1 | 2/2011 | McCann et al. |
| 2011/0042069 A1 | 2/2011 | Bailey et al. |
| 2011/0301784 A1 | 12/2011 | Oakley et al. |
| 2012/0006217 A1 | 1/2012 | Anderson |
| 2012/0085538 A1 | 4/2012 | Guerrero et al. |
| 2012/0094553 A1 | 4/2012 | Fujiwara et al. |
| 2012/0152542 A1 | 6/2012 | Le |
| 2012/0160491 A1 | 6/2012 | Goodman et al. |
| 2012/0180678 A1 | 7/2012 | Kneisl |
| 2012/0199031 A1 | 8/2012 | Lanclos |
| 2012/0226443 A1 | 9/2012 | Cresswell et al. |
| 2012/0241169 A1 | 9/2012 | Hales et al. |
| 2012/0242135 A1 | 9/2012 | Thomson et al. |
| 2012/0298361 A1 | 11/2012 | Sampson |
| 2013/0008639 A1 | 1/2013 | Tassaroli et al. |
| 2013/0048376 A1 | 2/2013 | Rodgers et al. |
| 2013/0062055 A1 | 3/2013 | Tolman et al. |
| 2013/0112396 A1 | 5/2013 | Splittstoeßer |
| 2013/0118342 A1 | 5/2013 | Tassaroli |
| 2013/0168083 A1 | 7/2013 | McCarter et al. |
| 2013/0199843 A1 | 8/2013 | Ross |
| 2013/0228326 A1 | 9/2013 | Griffith et al. |
| 2013/0248174 A1 | 9/2013 | Dale et al. |
| 2013/0256464 A1 | 10/2013 | Belik et al. |
| 2014/0033939 A1 | 2/2014 | Priess et al. |
| 2014/0053750 A1 | 2/2014 | Lownds et al. |
| 2014/0060839 A1 | 3/2014 | Wang et al. |
| 2014/0061376 A1 | 3/2014 | Fisher et al. |
| 2014/0083774 A1 | 3/2014 | Hoult et al. |
| 2014/0127941 A1 | 5/2014 | Lu |
| 2014/0131035 A1 | 5/2014 | Entchev et al. |
| 2014/0138090 A1 | 5/2014 | Hill et al. |
| 2014/0148044 A1 | 5/2014 | Balcer et al. |
| 2014/0209381 A1 | 7/2014 | Huang et al. |
| 2014/0218207 A1 | 8/2014 | Gano et al. |
| 2014/0360720 A1 | 12/2014 | Corbeil |
| 2015/0041124 A1 | 2/2015 | Rodriguez |
| 2015/0114626 A1 | 4/2015 | Hatten et al. |
| 2015/0136419 A1 | 5/2015 | Mauldin |
| 2015/0167410 A1 | 6/2015 | Garber et al. |
| 2015/0176386 A1 | 6/2015 | Castillo et al. |
| 2015/0209954 A1 | 7/2015 | Hokanson |
| 2015/0226533 A1 | 8/2015 | Grattan |
| 2015/0247375 A1 | 9/2015 | Stout |
| 2015/0260496 A1 | 9/2015 | Backhus et al. |
| 2015/0275615 A1 | 10/2015 | Rytlewski et al. |
| 2015/0337648 A1 | 11/2015 | Zippel et al. |
| 2015/0354310 A1 | 12/2015 | Zaiser |
| 2015/0356403 A1 | 12/2015 | Storm, Jr. |
| 2015/0361774 A1 | 12/2015 | Flores |
| 2016/0040502 A1 | 2/2016 | Robben |
| 2016/0053560 A1 | 2/2016 | Drury et al. |
| 2016/0069163 A1 | 3/2016 | Tolman et al. |
| 2016/0084048 A1 | 3/2016 | Harrigan et al. |
| 2016/0084075 A1 | 3/2016 | Ingraham et al. |
| 2016/0108722 A1 | 4/2016 | Whitsitt et al. |
| 2016/0115741 A1 | 4/2016 | Davis |
| 2016/0144734 A1 | 5/2016 | Wang et al. |
| 2016/0168942 A1 | 6/2016 | Broome et al. |
| 2016/0168961 A1 | 6/2016 | Parks et al. |
| 2016/0186511 A1 | 6/2016 | Coronado et al. |
| 2016/0186513 A1 | 6/2016 | Robertson et al. |
| 2016/0215592 A1 | 7/2016 | Helms et al. |
| 2016/0223171 A1 | 8/2016 | Gibbons et al. |
| 2016/0258240 A1 | 9/2016 | Fripp et al. |
| 2016/0273902 A1 | 9/2016 | Eitschberger |
| 2016/0290084 A1 | 10/2016 | LaGrange et al. |
| 2016/0290098 A1 | 10/2016 | Marya |
| 2016/0298404 A1 | 10/2016 | Beckett et al. |
| 2016/0356132 A1 | 12/2016 | Burmeister et al. |
| 2017/0009560 A1 | 1/2017 | Wells |
| 2017/0030162 A1 | 2/2017 | Carragher |
| 2017/0030186 A1* | 2/2017 | Rodgers ............... E21B 47/07 |
| 2017/0030693 A1 | 2/2017 | Preiss et al. |
| 2017/0032653 A1 | 2/2017 | Crawford et al. |
| 2017/0037716 A1 | 2/2017 | Kohlik |
| 2017/0044865 A1 | 2/2017 | Sabins et al. |
| 2017/0044875 A1 | 2/2017 | Hebebrand et al. |
| 2017/0052011 A1 | 2/2017 | Parks et al. |
| 2017/0058649 A1 | 3/2017 | Geerts et al. |
| 2017/0067303 A1 | 3/2017 | Thiemann et al. |
| 2017/0067320 A1 | 3/2017 | Zouhair et al. |
| 2017/0074078 A1 | 3/2017 | Eitschberger |
| 2017/0138150 A1 | 5/2017 | Yencho |
| 2017/0159379 A1 | 6/2017 | Metcalf et al. |
| 2017/0167233 A1 | 6/2017 | Sampson et al. |
| 2017/0175488 A1 | 6/2017 | Lisowski et al. |
| 2017/0199015 A1 | 7/2017 | Collins et al. |
| 2017/0204687 A1 | 7/2017 | Yorga et al. |
| 2017/0241244 A1 | 8/2017 | Barker et al. |
| 2017/0268320 A1 | 9/2017 | Angman et al. |
| 2017/0268326 A1 | 9/2017 | Tao et al. |
| 2017/0268860 A1 | 9/2017 | Fitschberger |
| 2017/0298716 A1 | 10/2017 | McConnell et al. |
| 2017/0306710 A1 | 10/2017 | Trydal et al. |
| 2017/0314372 A1 | 11/2017 | Tolman et al. |
| 2017/0314373 A9 | 11/2017 | Bradley et al. |
| 2017/0335646 A1 | 11/2017 | Huang et al. |
| 2017/0357021 A1 | 12/2017 | Valero et al. |
| 2018/0002999 A1 | 1/2018 | Johnson |
| 2018/0003038 A1 | 1/2018 | Cherewyk |
| 2018/0003045 A1 | 1/2018 | Dotson et al. |
| 2018/0030334 A1 | 2/2018 | Collier et al. |
| 2018/0080298 A1 | 3/2018 | Covalt et al. |
| 2018/0080300 A1 | 3/2018 | Angstmann et al. |
| 2018/0087330 A1 | 3/2018 | Bradley et al. |
| 2018/0087369 A1 | 3/2018 | Sherman et al. |
| 2018/0106121 A1 | 4/2018 | Griffin et al. |
| 2018/0120066 A1 | 5/2018 | Khatiwada et al. |
| 2018/0127641 A1 | 5/2018 | Nguyen et al. |
| 2018/0135398 A1 | 5/2018 | Entchev et al. |
| 2018/0148995 A1 | 5/2018 | Burky et al. |
| 2018/0156029 A1 | 6/2018 | Harrison et al. |
| 2018/0163497 A1 | 6/2018 | Younger |
| 2018/0171744 A1 | 6/2018 | Markel et al. |
| 2018/0171757 A1 | 6/2018 | Xu |
| 2018/0202248 A1 | 7/2018 | Harrington et al. |
| 2018/0202249 A1 | 7/2018 | Harrington et al. |
| 2018/0202789 A1 | 7/2018 | Parks et al. |
| 2018/0202790 A1 | 7/2018 | Parks et al. |
| 2018/0209250 A1 | 7/2018 | Daly et al. |
| 2018/0209251 A1 | 7/2018 | Robey et al. |
| 2018/0216445 A1 | 8/2018 | Collins et al. |
| 2018/0238132 A1 | 8/2018 | Oag et al. |
| 2018/0252054 A1 | 9/2018 | Stokes |
| 2018/0274356 A1 | 9/2018 | Hazel |
| 2018/0283836 A1 | 10/2018 | Thomas |
| 2018/0291700 A1 | 10/2018 | Tu et al. |
| 2018/0291715 A1 | 10/2018 | Barker |
| 2018/0299239 A1 | 10/2018 | Eitschberger et al. |
| 2018/0305993 A1 | 10/2018 | Perkins et al. |
| 2018/0306010 A1 | 10/2018 | Von Kaenel et al. |
| 2018/0313182 A1 | 11/2018 | Cherewyk et al. |

(56) References Cited

U.S. PATENT DOCUMENTS

| | | |
|---|---|---|
| 2018/0318770 A1 | 11/2018 | Eitschberger et al. |
| 2018/0328703 A1 | 11/2018 | Rensburg |
| 2018/0340412 A1 | 11/2018 | Singh et al. |
| 2018/0355674 A1 | 12/2018 | Cooper et al. |
| 2019/0031307 A1 | 1/2019 | Siersdorfer |
| 2019/0032470 A1 | 1/2019 | Harrigan |
| 2019/0040722 A1 | 2/2019 | Yang et al. |
| 2019/0048693 A1 | 2/2019 | Henke et al. |
| 2019/0049225 A1 | 2/2019 | Eitschberger |
| 2019/0085685 A1 | 3/2019 | McBride |
| 2019/0106956 A1 | 4/2019 | Wells |
| 2019/0128657 A1 | 5/2019 | Harrington et al. |
| 2019/0136673 A1 | 5/2019 | Sullivan et al. |
| 2019/0153827 A1 | 5/2019 | Goyeneche |
| 2019/0162055 A1 | 5/2019 | Collins et al. |
| 2019/0162056 A1 | 5/2019 | Sansing |
| 2019/0162057 A1 | 5/2019 | Montoya Ashton et al. |
| 2019/0186211 A1 | 6/2019 | Gonzalez |
| 2019/0195054 A1 | 6/2019 | Bradley et al. |
| 2019/0211655 A1 | 7/2019 | Bradley et al. |
| 2019/0218880 A1 | 7/2019 | Cannon et al. |
| 2019/0219375 A1 | 7/2019 | Parks et al. |
| 2019/0234188 A1 | 8/2019 | Goyeneche |
| 2019/0257158 A1 | 8/2019 | Langford et al. |
| 2019/0257181 A1 | 8/2019 | Langford et al. |
| 2019/0264548 A1 | 8/2019 | Zhao et al. |
| 2019/0277103 A1 | 9/2019 | Wells et al. |
| 2019/0284889 A1 | 9/2019 | LaGrange et al. |
| 2019/0292887 A1 | 9/2019 | Austin et al. |
| 2019/0309606 A1 | 10/2019 | Loehken et al. |
| 2019/0316449 A1 | 10/2019 | Schultz et al. |
| 2019/0330947 A1 | 10/2019 | Mulhern et al. |
| 2019/0330961 A1 | 10/2019 | Knight et al. |
| 2019/0338606 A1 | 11/2019 | Metcalf et al. |
| 2019/0338612 A1 | 11/2019 | Holodnak et al. |
| 2019/0353015 A1 | 11/2019 | LaGrange et al. |
| 2019/0366272 A1 | 12/2019 | Eitschberger et al. |
| 2019/0368293 A1 | 12/2019 | Covalt et al. |
| 2019/0368301 A1 | 12/2019 | Eitschberger et al. |
| 2019/0368319 A1 | 12/2019 | Collins et al. |
| 2019/0368321 A1 | 12/2019 | Eitschberger et al. |
| 2019/0368331 A1 | 12/2019 | Vick, Jr. et al. |
| 2020/0018132 A1 | 1/2020 | Ham |
| 2020/0018139 A1 | 1/2020 | Eitschberger et al. |
| 2020/0024934 A1 | 1/2020 | Eitschberger et al. |
| 2020/0024935 A1 | 1/2020 | Eitschberger et al. |
| 2020/0032603 A1 | 1/2020 | Covalt et al. |
| 2020/0032626 A1 | 1/2020 | Parks et al. |
| 2020/0048996 A1 | 2/2020 | Anthony et al. |
| 2020/0063537 A1 | 2/2020 | Langford et al. |
| 2020/0063553 A1 | 2/2020 | Zemla et al. |
| 2020/0095838 A1 | 3/2020 | Baker |
| 2020/0182025 A1 | 6/2020 | Brady |
| 2020/0199983 A1 | 6/2020 | Preiss et al. |
| 2020/0248535 A1 | 8/2020 | Goyeneche |
| 2020/0332618 A1 | 10/2020 | Eitschberger et al. |
| 2020/0362652 A1 | 11/2020 | Eitschberger et al. |
| 2020/0362654 A1 | 11/2020 | Eitschberger et al. |
| 2020/0362676 A1 | 11/2020 | Goyeneche |
| 2021/0040809 A1 | 2/2021 | Eitschberger |
| 2021/0123330 A1 | 4/2021 | Eitschberger et al. |
| 2021/0215039 A1 | 7/2021 | Scharf et al. |
| 2021/0355773 A1* | 11/2021 | Eitschberger ......... E21B 23/042 |
| 2022/0333467 A1* | 10/2022 | Eitschberger ......... E21B 33/068 |
| 2023/0101018 A1* | 3/2023 | Loehken ............... E21B 47/092 166/255.1 |

FOREIGN PATENT DOCUMENTS

| | | |
|---|---|---|
| CA | 2271620 A1 | 11/2000 |
| CA | 2833722 A1 | 5/2014 |
| CA | 2824838 A1 | 2/2015 |
| CA | 2933570 A1 | 11/2015 |
| CA | 2848060 C | 2/2021 |
| CN | 85101675 A | 1/1987 |
| CN | 1082601 C | 4/2002 |
| CN | 1199130 C | 4/2005 |
| CN | 2821154 | 9/2006 |
| CN | 1965148 A | 5/2007 |
| CN | 101397890 A | 4/2009 |
| CN | 201546707 U | 8/2010 |
| CN | 102738639 A | 10/2012 |
| CN | 104499977 A | 4/2015 |
| CN | 204430910 U | 7/2015 |
| CN | 208347755 U | 1/2019 |
| CN | 104481492 B | 6/2019 |
| DE | 10341437 A1 | 4/2005 |
| DE | 10344523 A1 | 4/2005 |
| DE | 602004006439 | 1/2008 |
| DE | 102007007498 | 10/2015 |
| EP | 0416915 A2 | 3/1991 |
| EP | 0721051 A3 | 4/1998 |
| EP | 1688584 B1 | 8/2011 |
| EP | 2952675 A2 | 9/2015 |
| EP | 2310616 B1 | 10/2017 |
| GB | 839486 A | 6/1960 |
| GB | 2065750 B | 6/1983 |
| GB | 2533822 A | 7/2016 |
| GB | 2544247 A | 5/2017 |
| GB | 2548101 A | 9/2017 |
| GB | 2534484 B | 4/2020 |
| RU | 2175379 C2 | 10/2001 |
| RU | 2439312 C1 | 1/2012 |
| RU | 2489567 C1 | 8/2013 |
| RU | 2561828 C2 | 9/2015 |
| WO | 1994021882 A1 | 9/1994 |
| WO | 0049271 A1 | 8/2000 |
| WO | 0133029 A3 | 5/2001 |
| WO | 0159401 A1 | 8/2001 |
| WO | 0133029 A2 | 12/2001 |
| WO | 2008066544 A2 | 6/2008 |
| WO | 2009091422 A2 | 7/2009 |
| WO | 2011051435 A2 | 5/2011 |
| WO | 2011146866 A2 | 11/2011 |
| WO | 2011150251 A1 | 12/2011 |
| WO | 2011160099 A1 | 12/2011 |
| WO | 2012006357 A2 | 1/2012 |
| WO | 2012140102 A1 | 10/2012 |
| WO | 2012161854 A2 | 11/2012 |
| WO | 2014178725 A1 | 11/2014 |
| WO | 2014179689 A1 | 11/2014 |
| WO | 2015028204 A2 | 3/2015 |
| WO | 2015081092 A2 | 6/2015 |
| WO | 2015081092 A3 | 8/2015 |
| WO | 2015173592 A1 | 11/2015 |
| WO | 2016100269 A1 | 6/2016 |
| WO | 2017029240 A1 | 2/2017 |
| WO | 2017041772 A1 | 3/2017 |
| WO | 2017125745 A1 | 7/2017 |
| WO | 2017147329 A1 | 8/2017 |
| WO | 2017199037 A1 | 11/2017 |
| WO | 2018057934 A1 | 3/2018 |
| WO | 2018094220 A1 | 5/2018 |
| WO | 2018182565 A1 | 10/2018 |
| WO | 2019117861 A1 | 6/2019 |
| WO | 2019229520 A1 | 12/2019 |
| WO | 2019229521 A1 | 12/2019 |
| WO | 2020002383 A1 | 1/2020 |
| WO | 2020002983 A1 | 1/2020 |
| WO | 2020035616 A1 | 2/2020 |
| WO | 2020254099 A1 | 12/2020 |

OTHER PUBLICATIONS

International Searching Authority; International Preliminary Report on Patentability of the International Searching Authority for PCT/EP2020/070291; dated Feb. 3, 2022; 8 pages.

United States Patent and Trademark Office, Non-final Office Action of U.S. Appl. No. 16/451,440, dated Oct. 24, 2019, 22 pgs.

United States Patent and Trademark Office; Advisory Action Before the Filing of an Appeal Brief for U.S. Appl. No. 16/537,720; dated Dec. 27, 2021; 3 pages.

(56) References Cited

OTHER PUBLICATIONS

United States Patent and Trademark Office; Advisory Action Before the Filing of an Appeal Brief for U.S. Appl. No. 17/254,198; dated Aug. 2, 2022; 3 pages.
United States Patent and Trademark Office; Ex Parte Quayle Action for U.S. Appl. No. 17/381,701; dated Sep. 16, 2022; 8 pages.
United States Patent and Trademark Office; Final Office Action for U.S. Appl. No. 17/141,989; dated Sep. 30, 2022; 15 pages.
United States Patent and Trademark Office; Final Office Action for U.S. Appl. No. 17/254,198; dated May 26, 2022; 19 pages.
United States Patent and Trademark Office; Non-Final Office Action for U.S. Appl. No. 16/537,720; dated Jan. 26, 2022; 15 pages.
United States Patent and Trademark Office; Non-Final Office Action for U.S. Appl. No. 16/919,473; dated Feb. 8, 2022; 12 pages.
United States Patent and Trademark Office; Non-Final Office Action for U.S. Appl. No. 17/059,205; dated Jun. 16, 2022; 17 pages.
United States Patent and Trademark Office; Non-Final Office Action for U.S. Appl. No. 17/141,989; dated May 10, 2022; 12 pages.
United States Patent and Trademark Office; Non-Final Office Action for U.S. Appl. No. 17/254,198; dated Dec. 22, 2021; 17 pages.
United States Patent and Trademark Office; Notice of Allowance for U.S. Appl. No. 16/858,041; dated Oct. 22, 2020; 10 pages.
United States Patent and Trademark Office; Notice of Allowance for U.S. Appl. No. 16/451,440; dated Jun. 5, 2020; 8 pages.
United States Patent and Trademark Office; Notice of Allowance for U.S. Appl. No. 16/537,720; dated Apr. 21, 2022; 9 pages.
United States Patent and Trademark Office; Patent Trial and Appeal Board Decision on Appeal; dated Apr. 11, 2022; 12 pages.
Wikipedia, Ring Laser, Sep. 13, 2006,13 pgs., https://en.wikipedia.org/wiki/Ring_laser.
Wikipedia, Sagnac Effect, Apr. 4, 2005, 14 pgs., https://en.wikipedia.org/wiki/Sagnac_effect.
Wikipedia, Wave Interference, Jun. 21, 2004, 11 pgs., https://en.wikipedia.org/wiki/Wave_interference.
Entchev et al., "Autonomous Perforating System for Multizone Completions," SPE 147296, Prepared for Presentation at Society of Petroleum Engineers (SPE) Annual Technical Conference and Exhibition held Oct. 30, 2011-Nov. 2, 2011, 7 pgs.
Entchev et al., Autonomous Perforating System for Multizone Completions, SPE International, 2011, 7 pgs., https://www.onepetro.org/conference-paper/SPE-147296-MS.
International Searchiing Authority, International Search Report and Written Opinion of International App. No. PCT/EP2019/063966, dated Aug. 30, 2019, 10 pages.
International Searching Authority, International Search Report and Written Opinion for PCT App. No. PCT/IB2019/000526; dated Sep. 25, 2019, 17 pgs.
International Searching Authority, International Search Report and Written Opinion for PCT App. No. PCT/IB2019/000530; dated Oct. 8, 2019; 13 pgs.
International Searching Authority, The International Search Report and Written Opinion of International App. No. PCT/IB2019/000537, dated Sep. 25, 2019, 18 pgs.
International Searching Authority; Communication Relating to the Results of the Partial International Search for PCT/EP2020/070291; dated Oct. 20, 2020; 8 pages.
International Searching Authority; International Preliminary Report on Patentability for International Application No. PCT/IB2019/000526; dated Dec. 10, 2020; 10 pages.
International Searching Authority; International Preliminary Report on Patentability for International Application No. PCT/IB2019/000537; dated Dec. 10, 2020; 11 pages.
International Searching Authority; International Preliminary Report on Patentability for PCT/EP2019/066919; dated Jan. 7, 2021; 9 pages.
International Searching Authority; International Preliminary Report on Patentability for PCT/IB2019/000530; dated Jan. 7, 2021; 9 pages.
International Searching Authority; International Preliminary Report on Patentability International Application No. PCT/EP2019/063966; dated Dec. 10, 2020; 7 pages.
International Searching Authority; International Preliminary Report on Patentability of the International Searching Authority for PCT/EP2019/072032; dated Mar. 4, 2021; 9 pages.
International Searching Authority; International Preliminary Report on Patentability of the International Searching Authority for PCT/EP2019/072064; dated Feb. 25, 2021; 9 pages.
International Searching Authority; International Search Report and Written Opinion for PCT App. No. PCT/EP2019/066919; dated Sep. 10, 2019; 11 pages.
International Searching Authority; International Search Report and Written Opinion for PCT App. No. PCT/EP2019/072032; dated Nov. 15, 2019; 13 pages.
International Searching Authority; International Search Report and Written Opinion for PCT App. No. PCT/EP2019/072064; dated Nov. 20, 2019; 15 pages.
International Searching Authority; International Search Report and Written Opinion for PCT Appl PCT/EP2020/065180; dated Oct. 6, 2020; 11 pages.
International Searching Authority; International Search Report and Written Opinion of the International Searching Authority for PCT/EP2020/070291; dated Dec. 15, 2020; 14 pages.
International Searching Authority; International Search Report and Written Opinion of the International Searching Authority for PCT/EP2020/075788; dated Mar. 16, 2021; 17 pages.
International Searching Authority; Invitation to Pay Additional Fees with Partial International Search for Application No. PCT/EP2020/075788; dated Jan. 19, 2021; 9 pages.
United States Patent and Trademark Office, Final Office Action of U.S. Appl. No. 16/423,230, dated Nov. 4, 2019, 14 pages.
United States Patent and Trademark Office, Final Office Action of U.S. Appl. No. 16/542,890, dated May 12, 2020, 16 pages.
United States Patent and Trademark Office, Non-Final Office Action of U.S. Appl. No. 16/451,440, dated Oct. 24, 2019, 22 pages.
United States Patent and Trademark Office, Non-Final Office Action of U.S. Appl. No. 16/423,230, dated Aug. 27, 2019, 16 pages.
United States Patent and Trademark Office, Non-Final Office Action of U.S. Appl. No. 16/788,107, dated Apr. 6, 2020, 15 pages.
United States Patent and Trademark Office, Notice of Allowance for U.S. Appl. No. 16/423,230, dated Nov. 27, 2019, 7 pages.
United States Patent and Trademark Office, Notice of Allowance for U.S. Appl. No. 16/788,107, dated Jul. 30, 2020, 9 pages.
United States Patent and Trademark Office; Final Office Action for U.S. Appl. No. 16/451,440; dated Feb. 7, 2020; 11 pages.
United States Patent and Trademark Office; Non-Final Office Action for U.S. Appl. No. 16/542,890; dated Nov. 4, 2019; 16 pages.
United States Patent and Trademark Office; Non-Final Office Action for U.S. Appl. No. 16/537,720; dated Jun. 15, 2021; 13 pages.
United States Patent and Trademark Office; Non-Final Office Action for U.S. Appl. No. 16/542,890; dated Sep. 30, 2020; 17 pages.
United States Patent and Trademark Office; Requirement for Restriction/Election for U.S. Appl. No. 16/537,720; dated Apr. 27, 2021; 8 pages.

\* cited by examiner

COMMUNICATION AND LOCATION SYSTEM FOR AN AUTONOMOUS FRACK SYSTEM

CROSS-REFERENCE TO RELATED APPLICATIONS

This application claims the benefit of U.S. Provisional Patent Application No. 63/247,898 filed Sep. 24, 2021, the entire contents of which are incorporated herein by reference.

BACKGROUND

Hydraulic Fracturing (or, "fracking") is a commonly used method for extracting oil and gas from geological formations (i.e., "hydrocarbon bearing formations") such as shale and tight-rock formations. Fracking typically involves, among other things, drilling a wellbore into a hydrocarbon bearing formation, deploying a perforating gun including shaped explosive charges into the wellbore via a wireline or other methods, positioning the perforating gun within the wellbore at a desired area, perforating the wellbore and the hydrocarbon formation by detonating the shaped charges, and pumping high hydraulic pressure fracking fluid into the wellbore to force open perforations, cracks, and imperfections in the hydrocarbon formation to liberate the hydrocarbons and collect them via a wellbore tubing or casing within the wellbore that collects the hydrocarbons and directs them to the surface. In an aspect of a fracking operation, a plug-and-perforate ("plug-and-perf") operation is often used. In a plug-and-perf operation, a tool string including a plug, such as a bridge plug, frac plug, or the like, a setting tool for the plug, and one or more perforating guns are connected together and sent downhole. The plug assembly is located furthest downstream (in a direction further into the wellbore) in the string and is connected to the setting tool which is in turn connected to the bottom (downstream)-most perforating gun. The setting tool is for activating (i.e., expanding) the plug to isolate a portion of the wellbore to be perforated. Isolating these portions, or "zones", makes more efficient use of the hydraulic pressure of the fracking fluid by limiting the volume that the fracking fluid must fill in the wellbore before it is forced into the perforations.

Using a setting tool for deploying the plug adds length to the tool string as well as potential failure points at the connections to the perforating guns/plug. A typical setting tool may use a pyrotechnic igniter and/or explosive to generate pressure for moving a piston that in turn forces a pressure, which may be a hydraulic pressure, into the plug assembly to expand the plug and shear the plug from the setting tool. Once the plug is expanded it makes contact with an inner surface of the wellbore casing and creates a fluid seal between the plug and the wellbore casing to isolate the zone with respect to the wellbore casing. The setting tool may be retrieved with the spent perforating guns on the tool string, after the perforating operation. Considering that most plugs include a hollow interior for housing components and accepting the pressures that will expand the plug, once the plug is in place a resulting open annulus in the plug must be sealed by, e.g., dropping into the wellbore a ball that is sized to set within the annulus of the plug and thereby fully isolate the zone. This process continues for each zone of the wellbore. Once the perforating operations are complete and the wellbore is ready for production, the balls and/or plugs remaining in the wellbore must be drilled out to allow hydrocarbons to travel to the surface of the wellbore for collection.

A long horizontal well, drilled through the oil-bearing formation, is virtually divided into several sections (or stages). Each stage is typically fracked individually. Current wellbore systems deploy a tool string including the aforementioned plug and setting tool, multiple perforation guns and one or more additional downhole tools. Such additional downhole tools may include casing collar locators (CCL) or gamma ray. The tool string may be conveyed by wireline and/or pumped into the well until the tool string is at the desired position or zone in the wellbore. Once positioned at the desired zone, the plug is set (with use of the setting tool). The wireline is then used to pull the tool string towards the surface of the wellbore—during this step, the perforation guns are sequentially fired. After that the plug is set, a frac ball is deployed into the wellbore and used to seal an inner flow path of the plug, and pumping can begin in order to frac the formation.

In an autonomous wellbore system, each plug, or combination of a plug and setting tool, and perforating gun is pumped individually in the well. Each of the plug, the combined plug and setting tool and the perforating gun may include a device or mechanism to facilitate the identification of its position in the wellbore. The device may also facilitate autonomous initiation of the system, when the predefined position or zone in the wellbore is reached.

A determination of the position can be made in several different ways. One such method, currently used in wireline operations, measures the gamma ray signature of the wellbore formation to identify the position based on comparison of the actual measurement with a previous logging run. Alternatively, the number of casing collars can be counted with a casing collar locator (CCL), and based on the counted number of collars the position of the tool in the wellbore can be determined. Another method may employ the use of radioactive markers or magnets/magnetic markers, which were installed on a wellbore casing before the wellbore tools are deployed into the wellbore. All these methods and equipment require the use of electronics for computing, sensors and a power supply, which all afterwards will remain in the wellbore.

There is a need for an autonomous wellbore tool that includes a positioning system to determine the location of an object in a wellbore.

BRIEF SUMMARY

According to an aspect, the exemplary embodiments include an autonomous wellbore tool. The autonomous wellbore tool may include a plug assembly and a positioning system provided on the plug assembly. According to an aspect, the positioning system includes a distance measurement system.

In another aspect, the exemplary embodiments include an autonomous wellbore tool that includes a transmitter plug assembly. According to an aspect, a sonar device may be secured to the transmitter plug assembly. The sonar device may be configured to find an object in a wellbore casing.

In a further aspect, the exemplary embodiments include a method of identifying a position of an autonomous tool in a wellbore. The method may include deploying the autonomous tool into the wellbore. The autonomous tool may further include a perforating gun comprising a detonator, a detonating cord and a shaped charge, a plug, and a sonar device coupled to the plug. According to an aspect, the method further includes setting the plug, and using the sonar device to determine a position of a subsequently deployed perforating gun relative to the plug.

BRIEF DESCRIPTION OF THE SEVERAL VIEWS OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to aid in understanding the features of the exemplary embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Reference will now be made in detail to various exemplary embodiments. Each example is provided by way of explanation and is not meant as a limitation and does not constitute a definition of all possible embodiments. It is understood that reference to a particular "exemplary embodiment" of, e.g., a structure, assembly, component, configuration, method, etc. includes exemplary embodiments of, e.g., the associated features, subcomponents, method steps, etc. forming a part of the "exemplary embodiment".

For purposes of this disclosure and without limitation, "autonomous" means without a physical connection or manual control. For purposes of this disclosure, "connected" means joined and may include, without limitation, attached by known mechanisms. For purposes of this disclosure, a "drone" is a self-contained, autonomous or semi-autonomous vehicle for downhole delivery of one or more wellbore tools.

For purposes of this disclosure, the phrases "devices," "systems," and "methods" may be used either individually or in any combination referring without limitation to disclosed components, grouping, arrangements, steps, functions, or processes.

An autonomous system is contemplated whereby a plug assembly is equipped with a positioning system for deployment in a wellbore. It is contemplated that the plug may be deployed in the wellbore with a setting tool. When the plug is set at the desired location in the wellbore (i.e., by at least one component of the plug expanding outwardly to affix to an inner surface of a wellbore casing), subsequent autonomous perforating guns are pumped down or otherwise deployed into the wellbore. The autonomous perforating guns are configured to communicate with a communication system housed in the plug. The communication system of the plug may be able to uniquely identify which autonomous perforating gun is inside the wellbore.

The autonomous system may include a sonar device. The sonar device finds objects in the wellbore, such as the perforating guns or the plug using sound waves. In an exemplary embodiment, the sonar device may be secured to the plug. The plug may be provided with a communication system configured to transmit a firing signal to a perforating gun, which may be equipped with a receiver and electronics configured to receive and interpret the firing signal. After the plug is set, the sonar is used to determine a position of a subsequently deployed perforating gun relative to the plug. When the perforating gun reaches a firing position, a firing signal is transmitted from the plug to the perforating gun, thereby causing the perforating gun to fire.

Alternatively, the sonar device may be secured to each autonomous perforating gun deployed in the wellbore. When the sonar device is positioned on each autonomous perforating gun, the position of the autonomous perforating gun relative to the plug is determined by the sonar device. When the gun is at the desired zone of perforating in the wellbore, a firing signal is sent, and shaped charges housed in the autonomous perforating gun are detonated.

In an embodiment, a plurality of autonomous perforating guns may be connected to each other and deployed in the wellbore as a single unit. In this configuration, the plurality of perforating guns may include a single sonar device.

It is further contemplated that the autonomous system may utilize other suitable distance measurement technology instead of sonar, such as a wellbore fluid pressure telemetry system. The wellbore fluid pressure telemetry system may be configured as a mud pressure telemetry system.

In an alternate embodiment, the plug is a transmitter plug. The transmitter plug may be deployed into the wellbore and positioned at a desired location with the help of seats, anchors or similar mechanisms that were preinstalled in the transmitter plug. The transmitter plug may include a communication system and a sonar device, as described hereinabove.

The various embodiments described herein reduces the electronic need for an autonomous wellbore system, which can also substantially reduce the amount of debris remaining in the wellbore.

Figure 1:
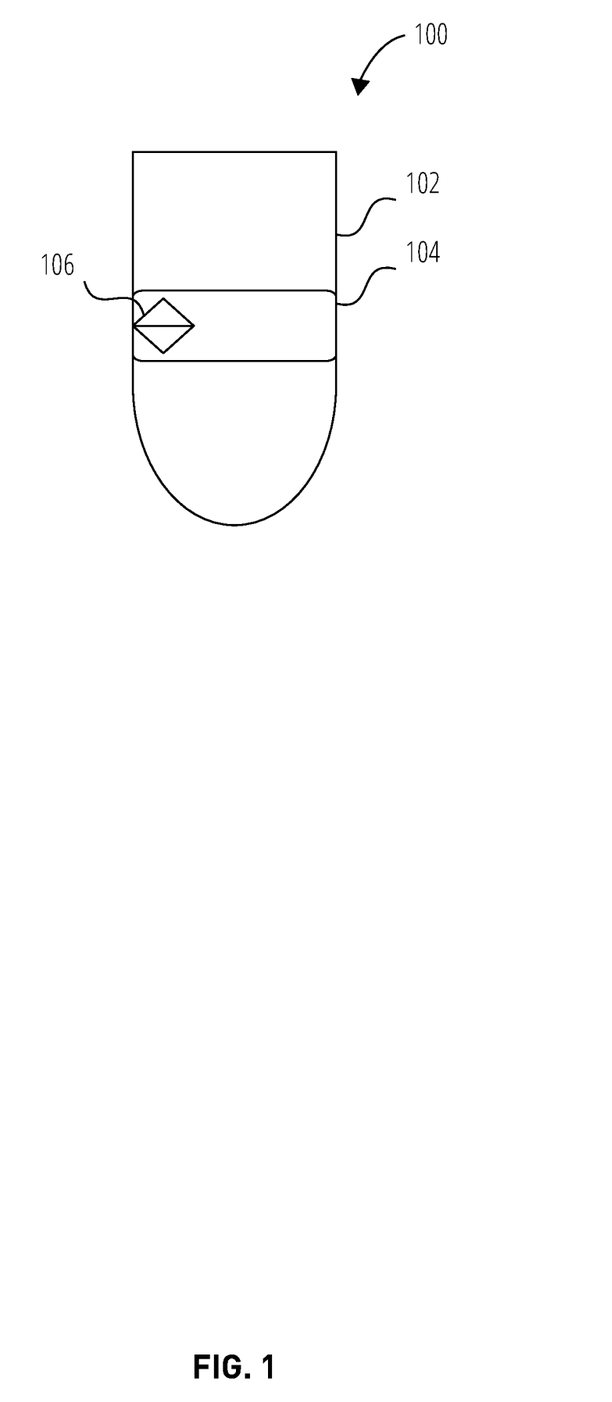
FIG. 1 is a cross-sectional side view of an autonomous wellbore tool including a positioning system, according to an embodiment.

FIG. 1 illustrates an autonomous wellbore tool 100. The autonomous wellbore tool 100 includes a plug assembly 102, and a positioning system 104 provided on the plug assembly 102.

The plug assembly 102 may include a self-setting plug that does not require a setting tool. Alternatively, the plug assembly 102 include a micro set plug. Alternatively, the plug assembly 102 may include an eliminator bridge plug.

According to an exemplary embodiment, the autonomous wellbore tool 100 may be a ballistically actuated plug. The ballistically actuated plug includes an outer carrier having a first end and a second end opposite the first end, and a hollow interior chamber within the outer carrier and defined by the outer carrier. The hollow interior chamber may extend from the first end to the second end of the outer carrier. An initiator, such as a detonator, is positioned within the hollow interior chamber and one or more ballistic components are also housed within the hollow interior chamber. The initiator and the one or more ballistic components are relatively positioned for the initiator to initiate the one or more ballistic components, and the one or more ballistic components include an explosive charge for expanding the outer carrier from an unexpanded form to an expanded form upon initiation of the one or more ballistic components. An exemplary embodiment of a ballistic instantaneous setting plug is described in International Application No. PCT/EP2020/070291 filed Jul. 17, 2020, published as WO 2021/013731 on Jan. 28, 2021, which is commonly owned and assigned to DynaEnergetics Europe GmbH, the entire contents of which are incorporated by reference herein. Other suitable types of plugs may be used as appropriate.

It is contemplated that the plug assembly 102 may be disposable such that the remains of the plug assembly 102 may be left in the wellbore. This eliminates the need for the plug assembly 102 or any associated debris from other components of the autonomous wellbore tool 100 from having to be withdrawn from the wellbore using tool retrieval mechanisms, such as a wireline.

According to an aspect and as illustrated in FIG. 1, the positioning system 104 includes a distance measurement system 106. The distance measurement system 106 includes a sonar device. According to an aspect, the sonar device is configured to transmit a sonar beam that scans the wellbore casing 202 to identify one or more objects in the wellbore. The sonar beam may include at least one target point to identify one or more objects in the wellbore. In an aspect, the sonar beam may include a hundred or several hundreds of target points in order to identify the one or more objects. It is contemplated that for each beam transmitted, an echo is returned (due to the present of the object, for example) in order to detect whether the one or more objects is present. The strength of the returned echo may be indicative of the location and distance of the one or more objects from the distance measurement system 106.

According to an aspect, the sonar device includes one or more sensors. The one or more sensors may be positioned along a longitudinal axis of a body of the sonar device. Each sensor of the one or more sensors may include a transmitter that emits a signal towards the interior of the wellbore casing 202. Each sensor of the one or more sensors may further include a receiver that is configured to detect a reflection (such as from the target points) of the transmitted signal from the wellbore casing 202. It is contemplated that the signal may include an acoustic signal. It is further contemplated that that the one or more sensors may be configured substantially similar to piezo-electrical sensors. According to an aspect, the receiver and transmitter may be separate or different from each another. In another aspect, the sensor may be provided as a unitary component including the receiver and transmitter.

According to an aspect, the distance measurement system 106 includes a wellbore fluid pressure telemetry system or a wellbore fluid pressure pulse transmission system. The wellbore fluid pressure telemetry system maybe configured to use variations in pressure in a wellbore fluid disposed in the wellbore casing 202 to determine the location of the one or more objects in the wellbore casing 202. It is contemplated that any such variations in pressure may be sensed and analyzed to determine the location of, for example, a perforating gun in the wellbore casing 202.

Figure 2:
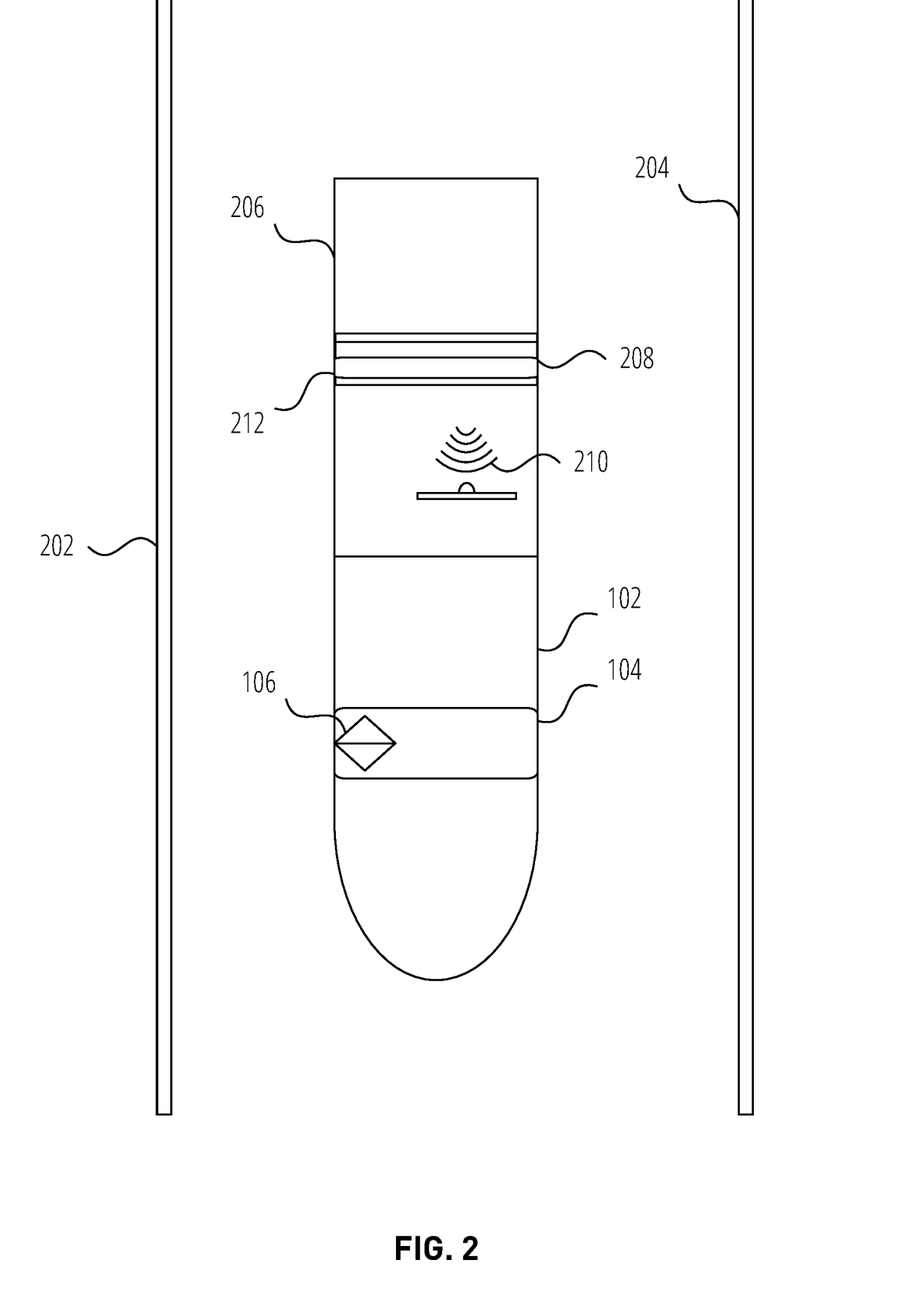
FIG. 2 is a cross-sectional view of the autonomous wellbore tool of FIG. 1, including a setting tool, according to an embodiment.

According to an aspect, and as illustrated in at least FIG. 2, the plug assembly 102 is configured to be secured in the wellbore casing 202. The plug assembly 102 may be secured in the wellbore casing 202 via a pre-installed securing mechanism comprising at least one of a plurality of seats, and a plurality of anchors.

According to an aspect, the plug assembly 102 includes an expansion element 208. The expansion element 208 may be a portion of the plug assembly 102. According to an aspect, the expansion element 208 is configured to expand outwardly to affix to an inner surface 204 of the wellbore casing 202. As would be understood by one of ordinary skill in the art, the expansion element 208 is so named because it is adapted to expand in volume (in an outward direction) as a result of either an explosive element that deforms the expansion element 208 in an outward direction or axial movement of a sleeve or housing relative to the expansion element 208 to deform the expansion element 208 of force it in an outward direction. The expansion element 208 may include one or more pre-installed securing mechanism 502 as described in further detail hereinbelow.

According to an aspect, the pre-installed securing mechanism includes a plurality of external gripping teeth formed on an outer surface of the plug assembly 102. The plug assembly 102 is dimensioned such that the gripping teeth will contact and/or penetrate an inner surface 204 of the wellbore casing 202 when the plug assembly 102 is in an expanded form. The gripping teeth may be shaped to frictionally grip the inner surface 204 of the wellbore casing 202 and thereby position the ballistically actuated plug 100 within the wellbore casing 202 and form a partial or total seal between the gripping teeth and the inner surface 204 of the wellbore casing 202, when the plug assembly 102 is in the expanded form.

According to an aspect, the plug assembly 102 includes a sealing element 212 that is formed from a material and in a configuration such that, in operation, the sealing element 212 will expand outwardly when the expansion element 208 transitions to its expanded form. The sealing element 212 may be disposed so that it is adjacent the expansion element 208. In an aspect, the sealing element 212 may extend around a portion of or an entire outer circumference or perimeter of the plug assembly 102. According to an aspect, the sealing element 212 is a portion of the expansion element 208. It is contemplated that the sealing element 212 may be dimensioned such that it will contact the inner surface 204 of the wellbore casing 202 and form a seal between the inner surface 204 of the wellbore casing 202 and the sealing element when the plug assembly 102 is in the expanded form. The sealing element 212 may be composed of rubber or a similar material that can provide a seal when positioned against a surface when, for example, the expansion element 208 expands outwardly to contact the inner surface 204 of the wellbore casing 202.

According to an aspect, the autonomous wellbore tool 100 further includes a setting tool 206. The plug assembly 102 may be secured to the setting tool 206 such that the plug assembly 102 is deployed in the wellbore casing 202 while secured to the setting tool 206.

According to an aspect, the setting tool 206 may be configured as a single use setting tool for actuating a tool in the wellbore casing 202. An exemplary embodiment of a single use setting tool is described in U.S. application Ser. No. 17/381,701 filed Jul. 21, 2021, published as US 2021/

355,773 on Nov. 19, 2021, which is commonly owned and assigned to DynaEnergetics Europe GmbH, the entire contents of which are incorporated by reference herein. The single use setting tool may include an inner piston having a piston proximal end, a piston distal end opposite the piston proximal end, and a piston inner wall. The piston proximal end may include a seal adapter portion and the piston inner wall may define a piston cavity. The single use setting tool may further include an outer sleeve having a sleeve proximal end, a sleeve distal end, and a sleeve central bore extending from the sleeve proximal end to the sleeve distal end. A portion of the inner piston including the piston cavity may be positioned within the sleeve central bore, a portion of the inner piston may extend beyond the sleeve distal end, and the inner piston and the outer sleeve may be configured for axially sliding relative to one another. The outer sleeve may include a shear element aperture extending from an outer surface of the outer sleeve to the sleeve central bore and the inner piston may include a shear element groove circumferentially extending in an outer surface of the inner piston. The shear element aperture and the shear element groove may together be configured for receiving a shear element extending between and positioned within each of the shear element aperture and the shear element groove, when the inner piston is at a first position relative to the outer sleeve.

According to an aspect, the autonomous wellbore tool 100 may further include a communication system 210 housed in the plug assembly 102. The communication system 210 may include at least one of an initiator, a conductive detonating cord, a feed through wire that serves to transfer electrical signals/communication, and a bulkhead assembly. As would be understood by one of ordinary skill in the art, the initiator, conductive detonating cord, and bulkhead assembly may transmit communication signals between the plug assembly 102 and at least one of a setting tool and a perforating gun. In an aspect, one or each of a setting tool and a perforating gun provided in the autonomous wellbore tool 100 may include its own communication device that is configured for transmitting communication signals between it and the communication system 210 of the plug assembly 102.

Figure 3:
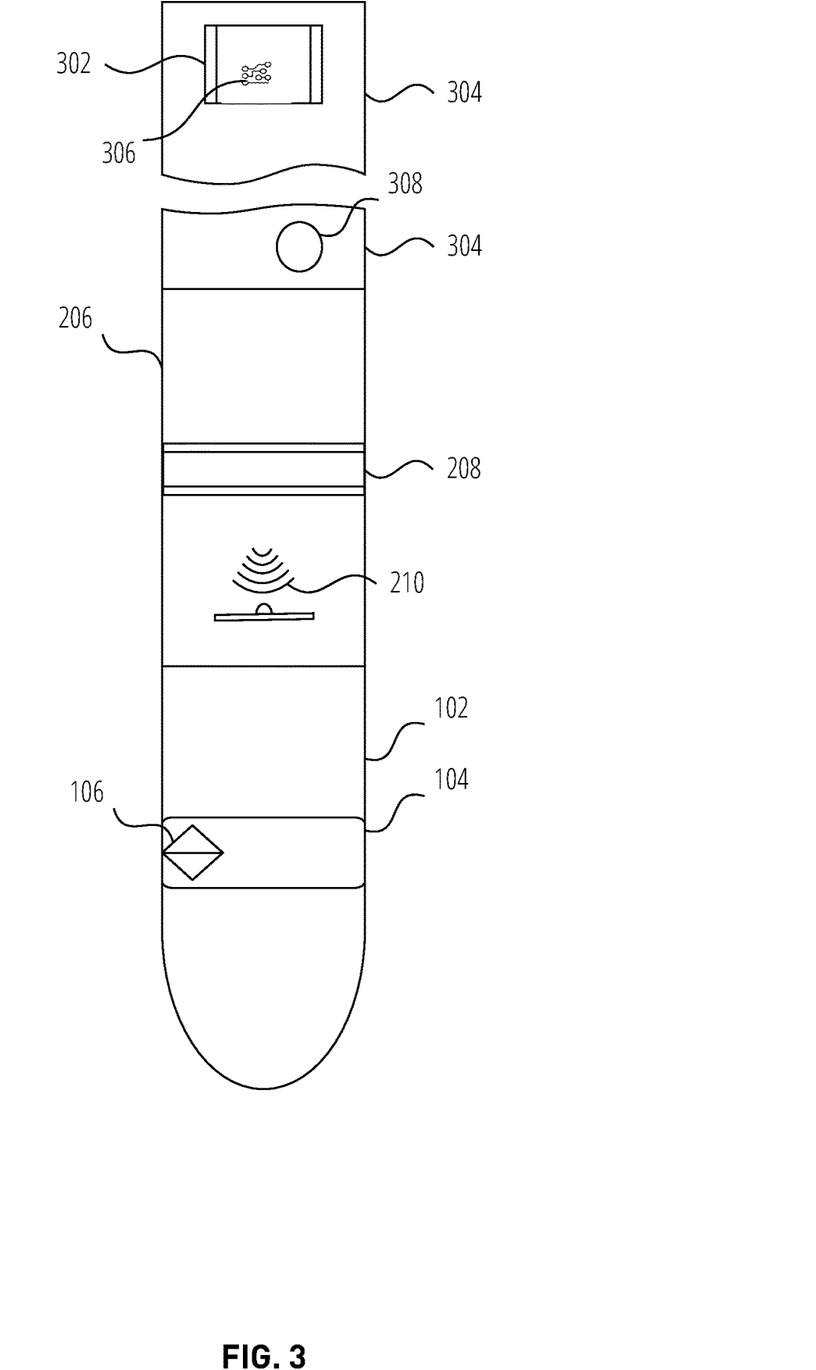
FIG. 3 is a cross-sectional view of the autonomous wellbore tool of FIG. 1, including a perforating gun coupled to a setting tool, according to an embodiment.

FIG. 3 illustrates the autonomous wellbore tool 100 including a perforating gun 304. The perforating gun 304 includes one or more of an initiator, an igniter, or a detonator assembly (collectively, "detonator 302"). The detonator 302 is equipped with an electronic circuit board 306. According to an aspect, the communication system 210 is configured to communicate with the electronic circuit board 306 of the detonator 302.

It is contemplated that the perforating gun 304 may be an autonomous perforating gun. The autonomous perforating gun may be pumped downhole with wellbore fluid, without conventional conveyance methods such as a wireline, e-line, coiled tubing or e-coil, or communicative connections with the surface of the wellbore.

Figure 4:
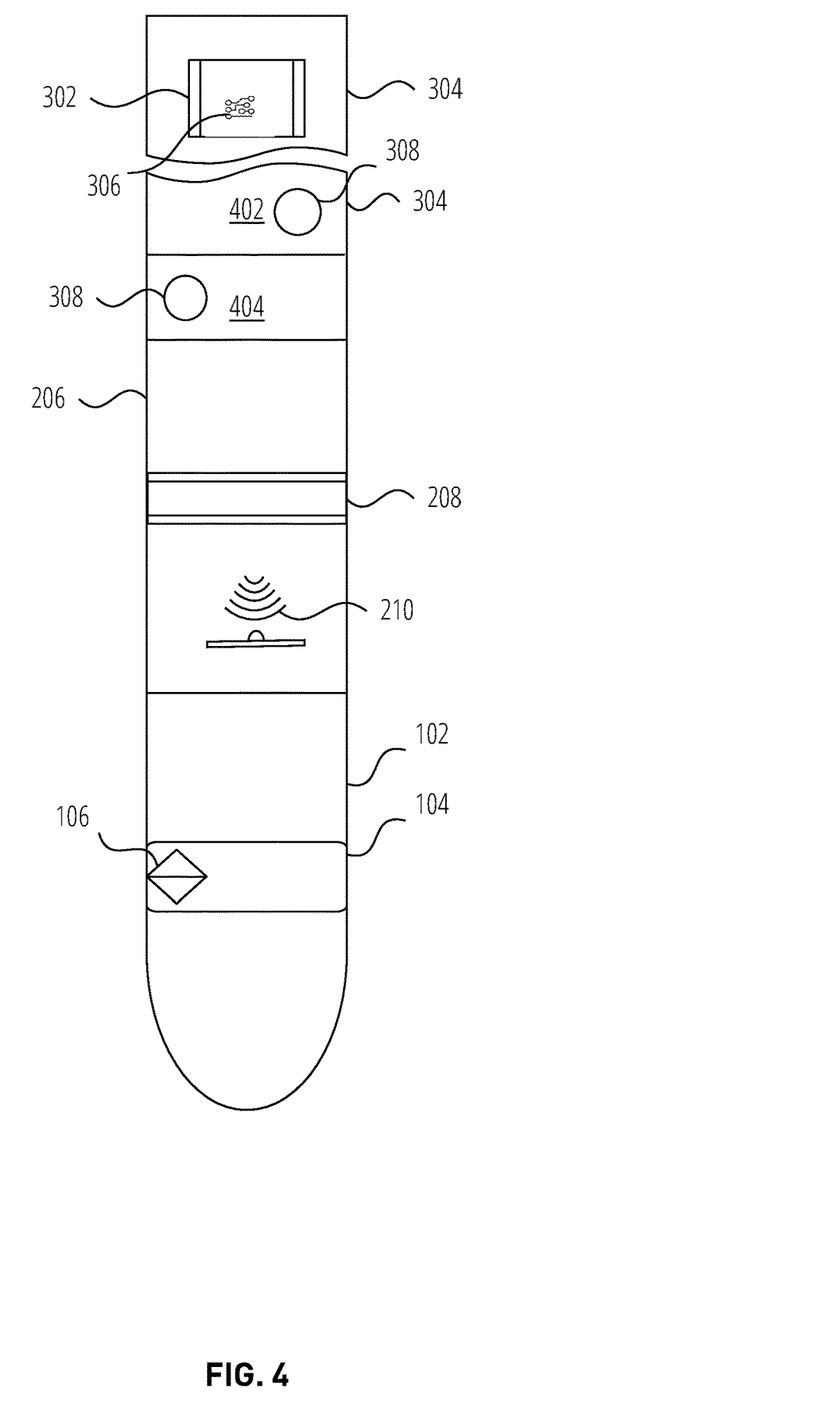
FIG. 4 is a cross-sectional view of the autonomous wellbore tool of FIG. 1, including a plurality of perforating guns coupled to a setting tool, according to an embodiment.

According to an aspect, and as illustrated in FIG. 4, the perforating gun 304 includes a first perforating gun 402 and a second perforating gun 404. According to an aspect, the first perforating gun 402 and the second perforating gun 404 may be directly connected to each other. For example, the first perforating gun 402 and the second perforating gun 404 may each include a perforating gun housing. The perforating gun housing may be configured substantially as described in U.S. Pat. No. 10,458,213, which is commonly owned and assigned to DynaEnergetics Europe GmbH, and is incorporated herein by reference in its entirety.

According to an aspect, the perforating gun housing includes a housing wall extending between a first housing portion including a first housing end and a second housing portion including a second housing end. The first housing portion defines a housing chamber and the second housing portion defines a bore. According to an aspect, the housing wall further includes a first outer surface extending from the first housing end and defining at least a portion of an outer wall of the housing chamber, a second outer surface extending from the second housing end toward the first housing end, and a face extending substantially perpendicularly to the second outer surface between the first outer surface and the second outer surface. The perforating gun housing may further include an exterior depression provided on the second housing portion configured for receiving a sealing mechanism, a first threaded portion formed on an inner circumferential surface of the housing chamber adjacent the first housing end for attachment to a first adjacent gun housing, and a second threaded portion formed on the second outer surface of the housing wall for attachment to a second adjacent gun housing. Alternatively, and in accordance with an embodiment, the first perforating gun 402 and the second perforating gun 404 may be coupled together using a sub or an adapter (not shown).

According to an aspect, the communication system 210 housed in the plug assembly 102 is configured to distinguish between the first perforating gun 402 and the second perforating gun 404. For example, the communication system 210 may communicate with the detonator 302 in the first perforating gun 402 when the first perforating gun 402 is the bottommost perforating gun 304 in the wellbore, before communicating with the detonator 302 of the second perforating gun 404.

Figure 5:
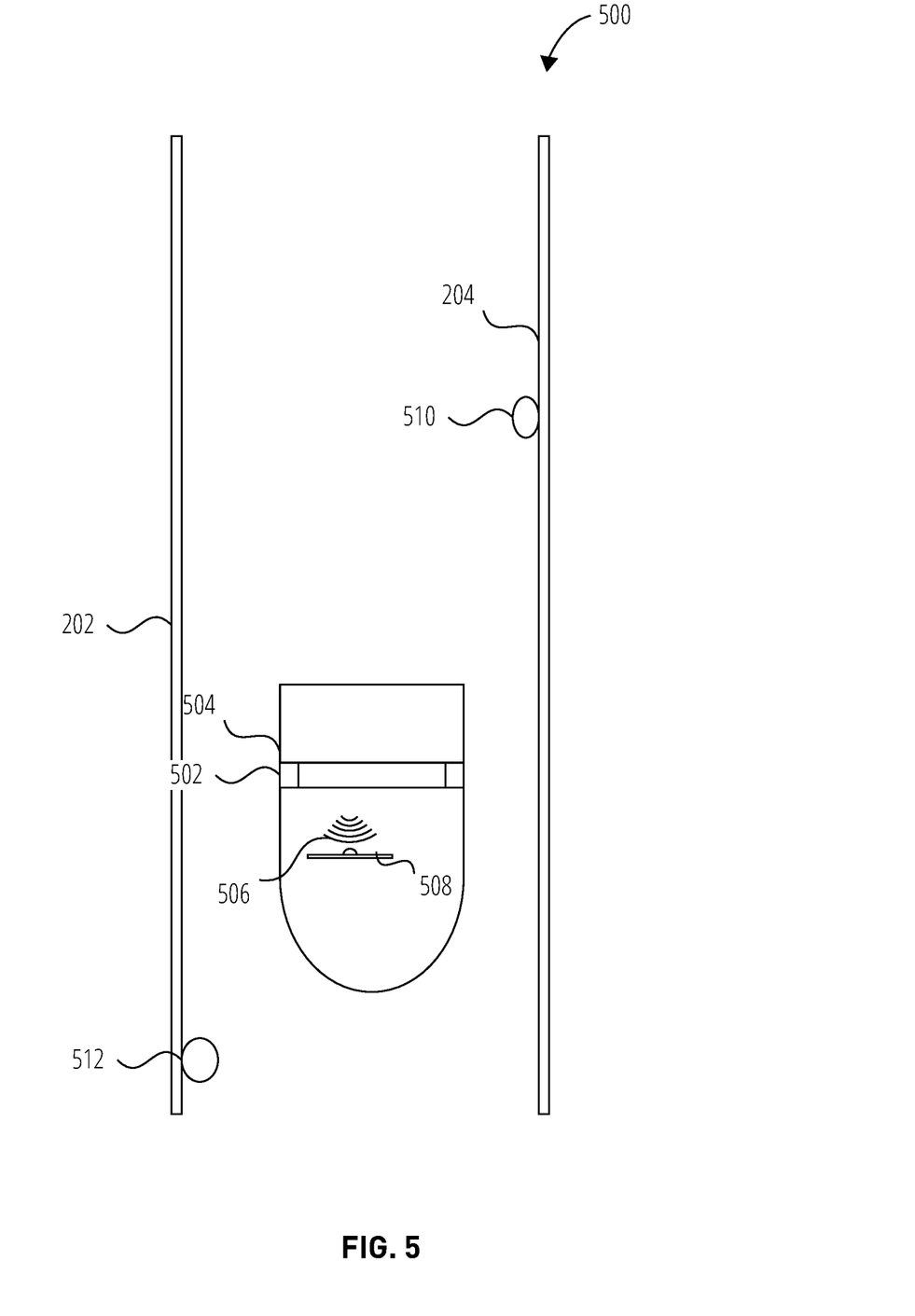
FIG. 5 is a cross-sectional view of an autonomous wellbore tool including a transmitter plug assembly.

Additional embodiments of the disclosure may be associated with an autonomous wellbore tool 500 that includes a transmitter plug assembly 504. According to an aspect, the transmitter plug assembly 504 is configured to be secured to an inner surface 204 in a wellbore casing 202 through the use of a pre-installed securing mechanism 502. The pre-installed securing mechanism 502 may include, for example, at least one of a plurality of seats, and a plurality of anchors.

According to an aspect, the autonomous wellbore tool 500 includes a sonar device 506. The sonar device 506 is configured to find an object in a wellbore casing 202. The sonar device 506 may be directly secured to or within the transmitter plug assembly 504. Alternatively, the sonar device 506 may be housed in a separate structure or housing that is coupled or otherwise secured to the transmitter plug assembly 504. For example, the sonar device 506 may be provided on or in a sub or housing that is coupled or otherwise attached or secured to the transmitter plug assembly 504 using threads or other fastening mechanisms for the housings or wellbore tools.

The sonar device 506 may include an active sonar transducer 508 that emits an acoustic signal or a pulse of sound when the autonomous wellbore tool 100 is positioned in the wellbore casing 202. According to an aspect, the active sonar transducer 508 is configured to determine the range and orientation of an object 510, 512 in the wellbore casing 202. The object 510, 512 may include, for example, a perforating gun 304. The active sonar transducer 508 may be configured to receive a return signal from the object 510, 512 in the wellbore casing 202. According to an aspect, the active sonar transducer 508 is configured to measure a strength of the return signal, determine a difference between the time the acoustic signal or the pulse of sound was emitted and the time the return signal is received.

Further embodiments of the disclosure are associated with a method 600 of identifying a position of an autonomous tool in a wellbore or wellbore casing 202. The method includes deploying the autonomous tool in the wellbore. The autonomous tool may be configured substantially as illustrated in any one of FIG. 1 to FIG. 5, and described hereinabove. According to an aspect, the autonomous tool includes a perforating gun 304 comprising a detonator 302, a detonating cord and a shaped charge. The autonomous tool may further include one or more of a plug assembly 102 and a distance measurement system 106 coupled to the plug assembly 102, and a transmitter plug assembly 504 and a sonar device 506 coupled to the transmitter plug assembly 504.

Figure 6:
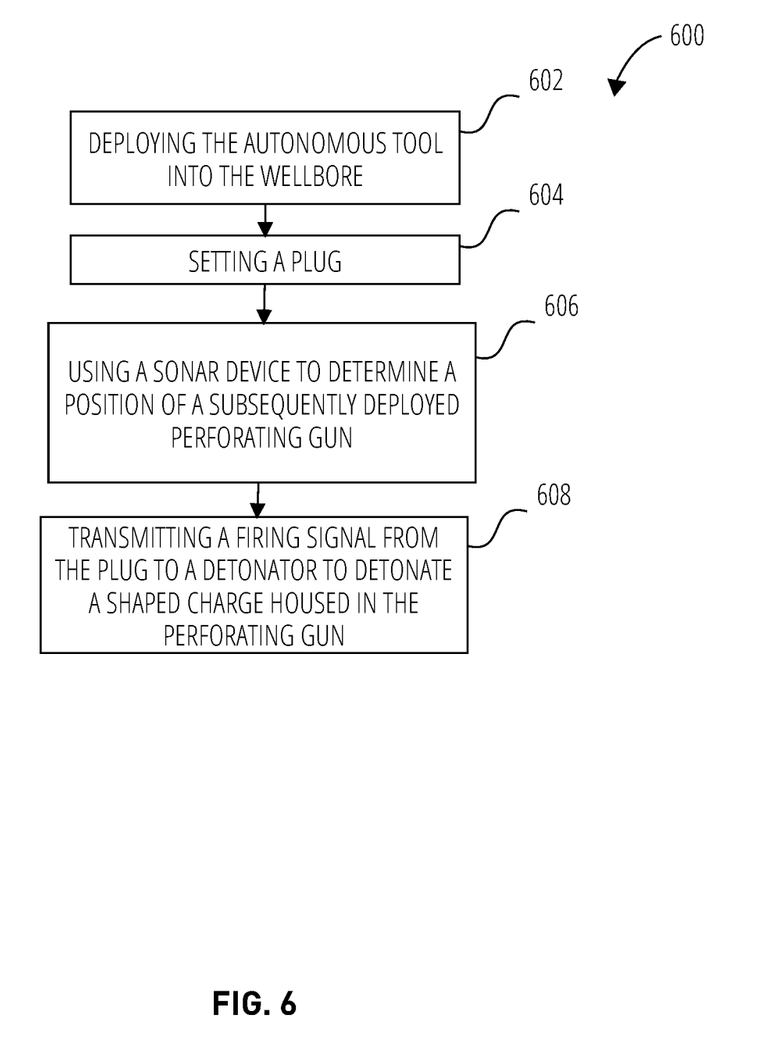
FIG. 6 is a chart illustrating a method of identifying a position of an autonomous tool in a wellbore.

The method further includes setting 604 the plug assembly 102 or the transmitter plug assembly 504. According to an aspect, the method further includes using the distance measurement system 106 or the sonar device 506 to determine 606 a position of a subsequently deployed perforating gun relative to the plug assembly 102 or the transmitter plug assembly 504.

The method further includes transmitting 608 a firing signal from the plug assembly 102 or the transmitter plug assembly 504 to the detonator in order to detonate the shaped charge. According to an aspect, the firing signal is transmitted from the communication system of the plug to the perforating gun 304. As described hereinabove, the perforating gun 304 may include a first perforating gun and a second perforating gun coupled to the first perforating gun. In this configuration, the method further includes transmitting a first firing signal from the plug to the detonator of the first perforating gun prior transmitting a second firing signal to the detonator of the second perforating gun.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Approximating language, as used herein throughout the specification and claims, may be applied to modify any quantitative representation that could permissibly vary without resulting in a change in the basic function to which it is related. Accordingly, a value modified by a term such as "about" or "approximately" is not to be limited to the precise value specified. Such approximating language may refer to the specific value and/or may include a range of values that may have the same impact or effect as understood by persons of ordinary skill in the art field. For example, approximating language may include a range of +/−10%, +/−5%, or +/−3%. The term "substantially" as used herein is used in the common way understood by persons of skill in the art field with regard to patents, and may in some instances function as approximating language. In some instances, the approximating language may correspond to the precision of an instrument for measuring the value.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. An autonomous wellbore tool comprising:
    a plug assembly;
    a positioning system provided on the plug assembly, wherein the positioning system comprises a distance measurement system;
    a communication system housed in the plug assembly; and
    a perforating gun, wherein the perforating gun comprises:
        a detonator including an electronic circuit board;
        a first perforating gun; and
        a second perforating gun,
    wherein the communication system is configured to communicate with the electronic circuit board, and wherein the communication system is configured distinguish between the first perforating gun and the second perforating gun.

2. The autonomous wellbore tool of claim 1, wherein the distance measurement system comprises a sonar device.

3. The autonomous wellbore tool of claim 1, wherein the distance measurement system comprises a wellbore fluid pressure telemetry system.

4. The autonomous wellbore tool of claim 1, further comprising:
    a setting tool,
    wherein the plug assembly is secured to the setting tool such that the plug assembly is deployed in the wellbore while secured to the setting tool.

5. The autonomous wellbore tool of claim 1, wherein the plug assembly comprises:
    an expansion element, wherein the expansion element is configured to expand outwardly to affix to an inner surface of a wellbore casing.

6. The autonomous wellbore tool of claim 1, wherein the perforating gun is an autonomous perforating gun.

7. The autonomous wellbore tool of claim 1, wherein the plug assembly is configured to be secured in a wellbore casing via a pre-installed securing mechanism comprising at least one of a plurality of seats, and a plurality of anchors.

8. An autonomous wellbore tool comprising:
    a transmitter plug assembly; and
    a sonar device secured to the transmitter plug assembly, wherein the sonar device is configured to find an object in a wellbore casing, wherein the sonar device comprises an active sonar transducer that emits an acoustic signal or pulse of sound when the autonomous wellbore tool is positioned in the wellbore casing,
    wherein the active sonar transducer is configured to determine the range and orientation of an object in the wellbore casing, and wherein the active sonar transducer is configured to receive a return signal from the object in the wellbore casing.

9. The autonomous wellbore tool of claim 8, wherein the transmitter plug assembly is configured to be secured to an inner surface in a wellbore casing via a pre-installed securing mechanism.

10. The autonomous wellbore tool of claim 8, wherein the pre-installed securing mechanism comprises at least one of a plurality of seats, and a plurality of anchors.

11. The autonomous wellbore tool of claim 8, wherein the active sonar transducer is configured to measure a strength of the return signal, and determine a difference between the time the acoustic signal or the pulse of sound is emitted and the time the return signal is received.

12. A method of identifying a position of an autonomous tool in a wellbore, the method comprising:
    deploying the autonomous tool in the wellbore, wherein the autonomous tool comprises:
        a plug; and
        a sonar device coupled to the plug;
    setting the plug; and
    using the sonar device, determining a position of a subsequently deployed perforating gun relative to the plug,
    wherein the autonomous tool further comprises a perforating gun secured to an upper end of the plug, the perforating gun comprising a detonator, a detonating cord, and a shaped charge, and
    wherein the method further comprises transmitting a firing signal from the plug to the detonator to detonate the shaped charge, wherein the firing signal is transmitted from the communication system of the plug.

13. The method of claim 12, wherein the perforating gun comprises a first perforating gun and a second perforating gun coupled to the first perforating gun, and the method further comprises:
    transmitting a first firing signal from the plug to the detonator of the first perforating gun; and
    transmitting a second firing signal from the detonator of the first perforating gun to a detonator of the second perforating gun.

* * * * *